(12) United States Patent (10) Patent No.: US 12,047,670 B2
Kanai et al. (45) Date of Patent: Jul. 23, 2024

(54) ELECTRONIC EQUIPMENT

(71) Applicant: Sony Semiconductor Solutions Corporation, Kanagawa (JP)

(72) Inventors: Junichi Kanai, Kanagawa (JP); Masashi Nakata, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 139 days.

(21) Appl. No.: 17/774,347

(22) PCT Filed: Nov. 5, 2020

(86) PCT No.: PCT/JP2020/041327
§ 371 (c)(1),
(2) Date: May 4, 2022

(87) PCT Pub. No.: WO2021/106513
PCT Pub. Date: Jun. 3, 2021

(65) Prior Publication Data
US 2022/0368833 A1 Nov. 17, 2022

(30) Foreign Application Priority Data
Nov. 29, 2019 (JP) .................. 2019-217380

(51) Int. Cl.
*H04N 23/63* (2023.01)
*H04N 5/04* (2006.01)
*H04N 23/667* (2023.01)

(52) U.S. Cl.
CPC .............. *H04N 23/63* (2023.01); *H04N 5/04* (2013.01); *H04N 23/667* (2023.01)

(58) Field of Classification Search
None
See application file for complete search history.

(56) References Cited

U.S. PATENT DOCUMENTS 8,743,269 B2 * 6/2014 Kunishige .............. H04N 23/60
348/349
2011/0043651 A1 * 2/2011 Nonaka ................ H04N 23/667
348/E5.022

(Continued)

FOREIGN PATENT DOCUMENTS

CN 110971805 A 4/2020
DE 102017214054 A1 * 3/2018 ............. G09G 5/006

(Continued)

OTHER PUBLICATIONS

International Search Report (PCT/ISA/210), International Application No. PCT/JP2020/041327, dated Jan. 26, 2021.

*Primary Examiner* — Reza Aghevli
(74) *Attorney, Agent, or Firm* — Michael Best & Friedrich LLP

(57) ABSTRACT

[Object]
Provided is electronic equipment that prevents degradation of image quality of captured images and display quality of a display section.
[Solving Means]
The electronic equipment includes a display section, an imaging section disposed opposite to a display surface of the display section, and a control section that synchronizes a display timing of the display section with an imaging timing of the imaging section such that the imaging section performs imaging at a timing when the display section does not perform displaying.

18 Claims, 23 Drawing Sheets

(56) References Cited

U.S. PATENT DOCUMENTS

| | | | |
|---|---|---|---|
| 2011/0285680 A1* | 11/2011 | Nakamura | H04N 7/144 345/207 |
| 2012/0257006 A1* | 10/2012 | Matsumoto | G03B 37/04 348/E7.001 |
| 2012/0257007 A1* | 10/2012 | Matsumoto | G03B 37/04 348/E7.001 |
| 2012/0257085 A1* | 10/2012 | Matsumoto | H04N 23/633 348/239 |
| 2013/0182062 A1 | 7/2013 | Son | |
| 2013/0342518 A1* | 12/2013 | Nakata | H04N 23/88 345/207 |
| 2015/0049165 A1 | 2/2015 | Choi | |
| 2015/0379725 A1* | 12/2015 | Kuwahara | H04N 7/181 348/143 |
| 2018/0069060 A1 | 3/2018 | Rappoport et al. | |
| 2018/0126904 A1* | 5/2018 | Amano | H04N 23/682 |
| 2023/0103098 A1* | 3/2023 | Nakata | H04N 23/632 348/36 |
| 2023/0142989 A1* | 5/2023 | Yakura | H04N 23/11 348/207.99 |
| 2023/0282022 A1* | 9/2023 | Nakata | G06V 40/1318 348/77 |

FOREIGN PATENT DOCUMENTS

| | | | | |
|---|---|---|---|---|
| JP | H09-005815 A | | 1/1997 | |
| JP | 2007-088536 A | | 4/2007 | |
| JP | 2007088536 A | * | 4/2007 | ............ G09G 5/006 |
| JP | 2013-186232 A | | 9/2013 | |
| JP | 2014-191020 A | | 10/2014 | |
| JP | 2018-036638 A | | 3/2018 | |
| JP | 2018036638 A | * | 3/2018 | ............ G09G 5/006 |
| JP | 2018-124457 A | | 8/2018 | |
| JP | 2018124457 A | * | 8/2018 | ............ G09G 5/006 |

* cited by examiner (a) (b)

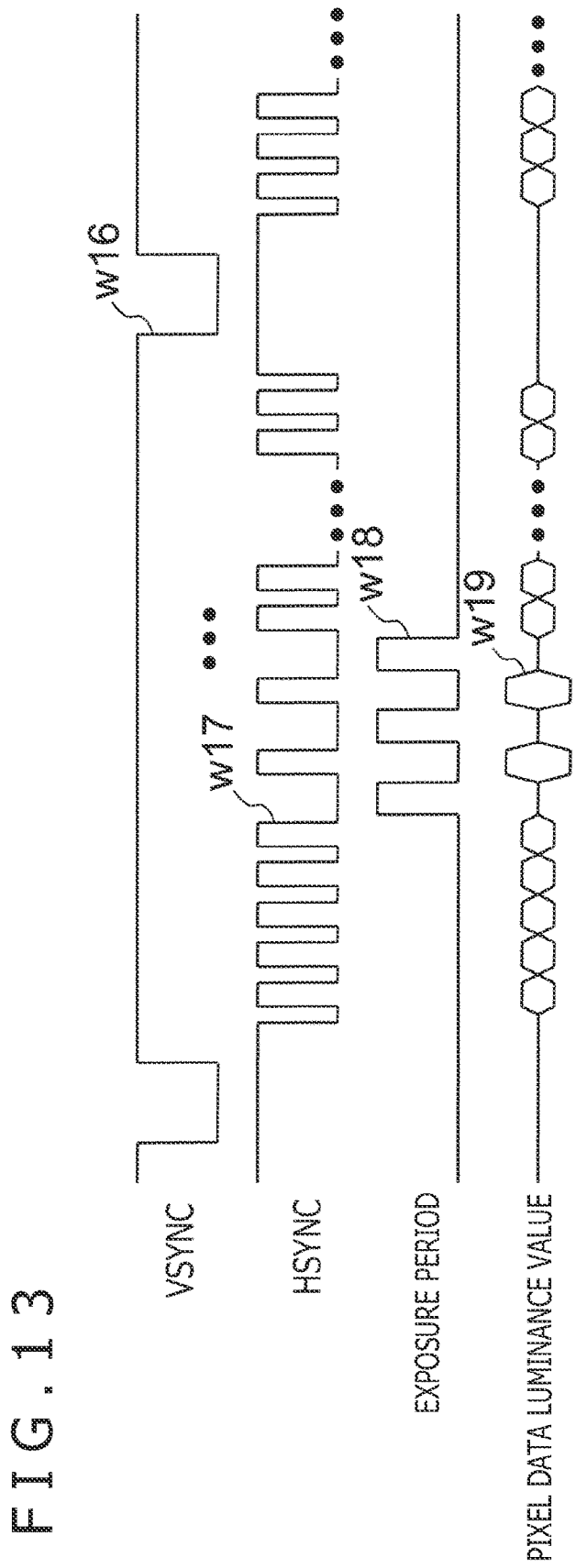

ELECTRONIC EQUIPMENT

TECHNICAL FIELD

The present disclosure relates to electronic equipment.

BACKGROUND ART

In recent electronic equipment such as smartphones, cellular phones, and PCs (Personal Computers), a camera is mounted on a bezel of a display section to easily allow a video chat or video shooting. A smartphone or a cellular phone is often carried in a pocket or a bag, and thus needs to have as compact an external size as possible. On the other hand, a smaller-sized display screen reduces the size of characters displayed, which decreases with increasing display resolution, making the characters difficult to view. Hence, studies have been conducted for reducing the width of the bezel, located at the periphery of the display screen, to make the size of the display screen as large as possible without increasing the external size of the electronic equipment.

However, a camera or the like is often mounted on the bezel of the electronic equipment, preventing the bezel width from being made smaller than the outer diameter size of the camera.

Further, in a case where the camera is disposed on the bezel, for example, during a video chat, the gaze is often focused near the center of the display screen and is misaligned with the optical axis of the camera. This leads to a captured image with a misaligned gaze, which brings a sense of discomfort.

To avoid the problem described above, a configuration in which a camera module is disposed opposite to a display surface of the display section and in which a camera captures an image of subject light having passed through the display section has been proposed.

CITATION LIST

Patent Literature

[PTL 1]
U.S. Published Application No. 2018/0069060

SUMMARY

Technical Problems

However, when the camera module is disposed opposite to the display surface of the display section, light having passed through the display section is incident on the camera module, degrading the image quality of the captured image under the effect of display luminance of the display section.

Further, a possible measure includes reducing the pixel density of a display region of a part of the display section that overlaps an arrangement position of the camera module, or the like. However, this may partly reduce the display quality of the display section, leading to display that gives a sense of discomfort.

An aspect of the present disclosure provides electronic equipment prevented from degrading the image quality of the captured image and the display quality of the display section.

Solution to Problems

To solve the problems described above, an aspect of the present disclosure provides electronic equipment including a display section, an imaging section disposed opposite to a display surface of the display section, and a control section that synchronizes a display timing of the display section with an imaging timing of the imaging section such that the imaging section performs imaging at a timing when the display section does not perform displaying.

The control section may set a longer period of time in which the display section does not perform displaying, when the imaging section performs imaging than in a case where the imaging section does not perform imaging.

The control section may set a lower frequency at which at least some of pixels in the display section are displayed, when the imaging section performs imaging than in the case where the imaging section does not perform imaging.

The control section may set a lower frame rate for the display section when the imaging section performs imaging than in the case where the imaging section does not perform imaging.

The control section may set a lower display frequency for at least some of horizontal pixel lines in the display section when the imaging section performs imaging than in the case where the imaging section does not perform imaging.

The control section may set a lower display frequency for the some horizontal pixel lines including a display region overlapping the imaging section as the display section is viewed in plan from a normal direction of the display surface, when the imaging section performs imaging than in the case where the imaging section does not perform imaging.

The control section may set an exposure time for the imaging section according to the period in which the display section does not perform displaying.

The control section may set a lower display pixel density for at least a partial display region of the display section when the imaging section performs imaging than in the case where the imaging section does not perform imaging.

The control section may set a lower display pixel density for a partial display region including a display region overlapping the imaging section as the display section is viewed in plan from the normal direction of the display surface, when the imaging section performs imaging than in the case where the imaging section does not perform imaging.

The control section may set a higher luminance value for pixels in at least a partial display region of the display section when the imaging section performs imaging than in the case where the imaging section does not perform imaging.

The control section may set a higher luminance value for pixels in the partial display region including a display region overlapping the imaging section as the display section is viewed in plan from the normal direction of the display surface, when the imaging section performs imaging than in the case where the imaging section does not perform imaging.

The control section may set a lower frequency at which the pixels in the partial display region are displayed and a higher luminance value for the pixels when the imaging section performs imaging than in the case where the imaging section does not perform imaging.

The display section may include a first display surface and a second display surface that are stacked one on another and that are separately controlled for display, the first display surface may display a display region of the display section except for the partial display region, and the second display surface may display the partial display region such that the partial display region does not overlap the display region of the first display surface when the second display surface is stacked on the first display surface.

The electronic equipment may include at brightness detection section that detects surrounding brightness, and the control section may control, according to the surrounding brightness detected by the brightness detection section, a frequency at which at least some of pixels in the display section are displayed when the imaging section performs imaging.

The control section may control, according to the surrounding brightness detected by the brightness detection section, a frequency and a display pixel density at which at least some of the pixels in the display section are displayed when the imaging section performs imaging.

The electronic equipment may include a timing detection section that detects a timing of a blink of a person with a gaze directed to the display section, and, according to the timing detected by the timing detection section, the control section may temporarily set display on the display section to a non-light-emission state and cause the imaging section to perform imaging.

The imaging section may photoelectrically convert at least one of visible light and infrared light.

The display section may include an opening at a position overlapping the imaging section as the display section is viewed in plan from a normal direction of the display surface, and the opening may be disposed to penetrate at least one of multiple layers constituting the display section, the layers having transmittance of less than a predetermined value with respect to light with a predetermined wavelength band.

The display section may include multiple layers having transmittance of a predetermined value or larger with respect to light with a wavelength band that is photoelectrically convertible by the imaging section.

The control section may include a first control section that controls the display section for display, and a second control section that cooperates with the first control section in controlling the imaging section for imaging.

BRIEF DESCRIPTION OF DRAWINGS

FIG. 13 is an operation timing diagram corresponding to the flowchart in FIG. 12.

DESCRIPTION OF EMBODIMENTS

Embodiments of electronic equipment will be described below with reference to the drawings. In the description below, main components of the electronic equipment will mainly be described. However, the electronic equipment may include components and functions not illustrated or described. The description below does not intend to exclude components and functions not illustrated or described.

First Embodiment

Figure 1A:
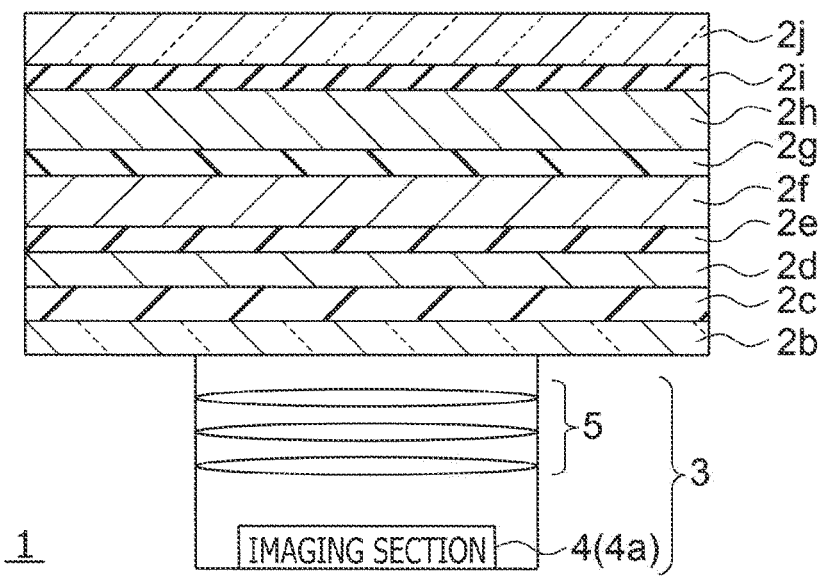
FIG. 1A is a schematic cross-sectional view of electronic equipment according to a first embodiment.
Figure 1B:
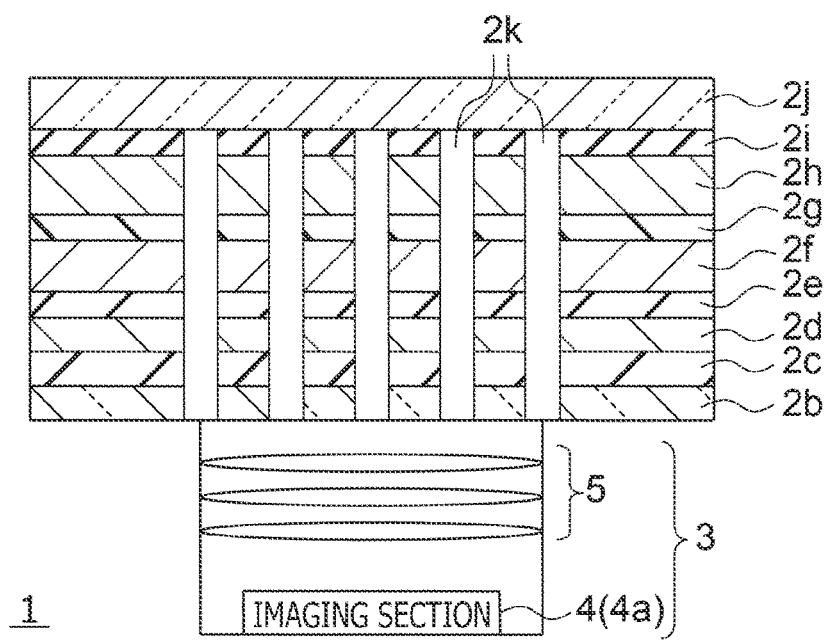
FIG. 1B is a cross-sectional view of the electronic equipment in FIG. 1A that is provided with openings.

FIG. 1A and FIG. 1B are schematic cross-sectional views of electronic equipment 1 according to a first embodiment. The electronic equipment 1 in FIG. 1A is any electronic equipment 1 such as a smartphone, a cellular phone, a tablet, or a PC which includes both a display function and an image capturing function. The electronic equipment 1 in FIG. 1A includes a camera module (imaging section) disposed opposite to a display surface 1a of a display section 2. In such a manner, the electronic equipment 1 in FIG. 1A is provided with a camera module 3 on a rear side of the display surface 1a of the display section 2. Thus, the camera module 3 captures images through the display section 2.

Figure 2:
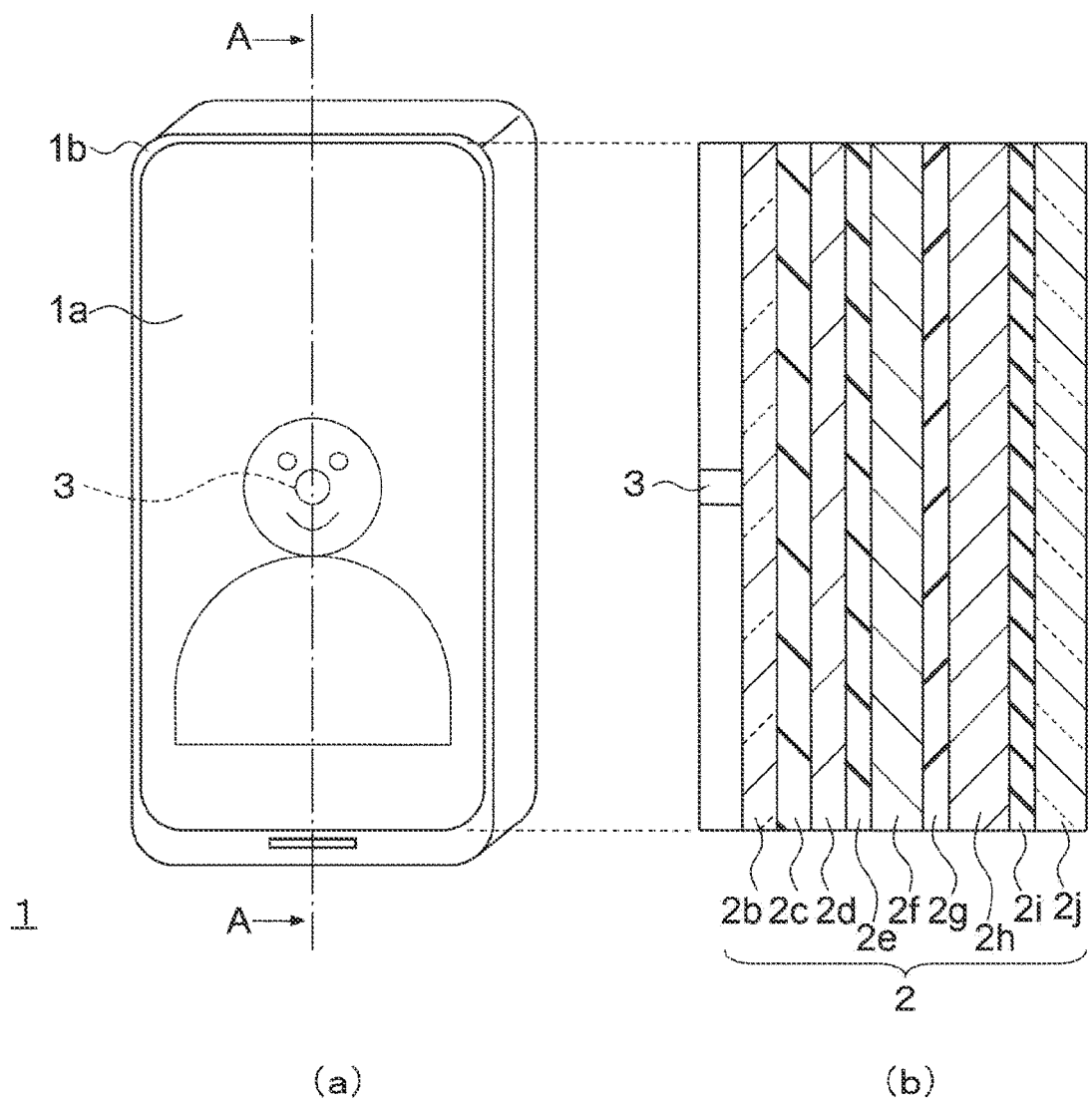
FIG. 2(a) is a schematic diagram of the appearance of the electronic equipment in FIG. 1A.
FIG. 2(b) is a cross-sectional view of the electronic equipment 1 taken in the direction of line A-A in FIG. 2(a).

FIG. 2(a) is a schematic diagram of the appearance of the electronic equipment 1 in FIG. 1A, and FIG. 2(b) is a cross-sectional view of the electronic equipment 1 taken in the direction of line A-A in FIG. 2(a). In an example in FIG. 2(a), the display surface 1a approximately spans the external size of the electronic equipment 1, limiting, to several mm or less, the width of a bezel 1b located at the periphery of the display surface 1a. Typically, a front camera is mounted on the bezel 1b. However, in FIG. 2(a), the camera module 3 functioning as a front camera is disposed on the rear surface side of a generally central portion of the display surface 1a, as indicated by a broken line. By thus providing the front camera on the rear surface side of the display surface 1a, the need to dispose the front camera on the bezel 1b is eliminated, enabling a reduction in the width of the bezel 1b.

Note that although, in FIG. 2(a), the camera module 3 is disposed on the rear surface side of the generally central portion of the display surface 1a, in the present embodiment, the camera module 3 is only required to be disposed on the rear surface side of the display surface 1a, for example, the camera module 3 may be disposed on the rear surface side of a position near the peripheral portion of the display surface 1a. In such a manner, the camera module 3 according to the present embodiment is disposed at any position on the rear surface side overlapping the display surface 1a.

As depicted in FIG. 1A, the display section 2 is a laminate including a protective film 2b, a polyimide substrate 2c, a display layer 2d, a barrier layer 2e, a touch sensor layer 2f, an adhesive layer 2g, a circularly polarizing plate 2h, an optical adhesive sheet (OCA: Optical Clear Adhesive) 2i, and cover glass 2j that are laminated one on another in this order. The display layer 2d may be, for example, an OLED (Organic Light Emitting Device) display layer, a liquid crystal display layer, MicroLED, or a display layer based on any other display principle. The display layer 2d may include multiple layers. For example, the display layer 2d may include a color filter layer, a backlight layer, and the like. The display section 2 provides display using light with a visible light wavelength band. However, light displayed by the display section 2 may include infrared light.

The barrier layer 2e is a layer that prevents oxygen or moisture from entering the display layer 2d. The touch sensor layer 2f incorporates a touch sensor. The touch sensor is of various types involving capacitance, a resistance film, and the like, and any of the types may be adopted. Further, the touch sensor layer 2f and the display layer 2d may be integrated.

The adhesive layer 2g is provided to bond the circularly polarizing plate 2h to the touch sensor layer 2f. A material having high visible light transmittance is used for the adhesive layer 2g. The circularly polarizing plate 2h is provided to reduce glare and to increase the visibility of the display surface 1a even in a bright environment. The optical adhesive sheet 2i is provided to enhance adhesiveness between the circularly polarizing plate 2h and the cover glass 2j. A material having high visible light transmittance is used for the optical adhesive sheet 2i. The cover glass 2j is provided to protect the display layer 2d and the like. Note that the layer configuration of the display section 2 is not necessarily limited to the one depicted in FIG. 1A and FIG. 2.

The camera module 3 is disposed opposite to the display surface 1a of the display section 2, that is, on a rear side of the display section 2. The camera module 3 includes an imaging section 4 and an optical system 5. The optical system 5 is disposed on a light incident surface side of the imaging section 4, that is, near the display section 2, to focus, on the imaging section 4, light having passed through the display section 2. The optical system 5 typically includes multiple lenses. As described later, multiple camera modules 3 may be disposed opposite to the display surface 1a of the display section 2. In this case, the optical systems 5 of the camera modules 3 may have different focal lengths, thus allowing capturing of images at different angles of view as is the case with a telephoto lens and a wide-angle lens.

The imaging section 4 includes a photoelectric conversion section 4a. The photoelectric conversion section 4a photoelectrically converts light incident via the display section 2. The photoelectric conversion section 4a may be a CMOS (Complementary Metal Oxide Semiconductor) sensor or a CCD (Charge Coupled Device) sensor. Further, the photoelectric conversion section 4a may be a photodiode or an organic photoelectric conversion film.

The photoelectric conversion section 4a includes photoelectric conversion elements such as CMOS sensors for the respective pixels. The pixels can be arranged in an optional manner. Specifically, the manner of arrangement of the pixels may be a Bayer arrangement, an interline arrangement, a checked arrangement, a striped arrangement, or any other arrangement.

As depicted in FIG. 1A and FIG. 2(b), in the electronic equipment 1 of the present embodiment, the display section 2 and the camera module 3 are disposed overlapping in a front to back direction. Thus, the camera module 3 images subject light transmitted through the display section 2. The display section 2 includes multiple layers as depicted in FIG. 1A, and no problem occurs in a case where each of the layers has high transmittance for light with a wavelength band for which the imaging section 4 has sufficient sensitivity. However, in reality, some of the layers may have low transmittance. For example, the polyimide substrate 2c does not have high visible light transmittance. Accordingly, as depicted in FIG. 1B, one or more openings 2k may be formed in layers that are among the multiple layers constituting the display section 2 and that do not have high transmittance, and the camera module 3 may image light having passed through the openings 2k. In an example in FIG. 1B, multiple openings 2k that penetrate all of the multiple layers constituting the display section 2 other than the cover glass 2j are provided. The openings 2k are provided at positions overlapping the camera module 3 when the display section 2 is viewed in plan. The diameter and the number of the openings 2k are set to appropriate values in consideration of display on the display section 2 and the image quality of images captured by the imaging section 4.

Note that the openings 2k need not necessarily be provided in a case where a very transparent substrate is used in place of the polyimide substrate 2c.

Figure 3:
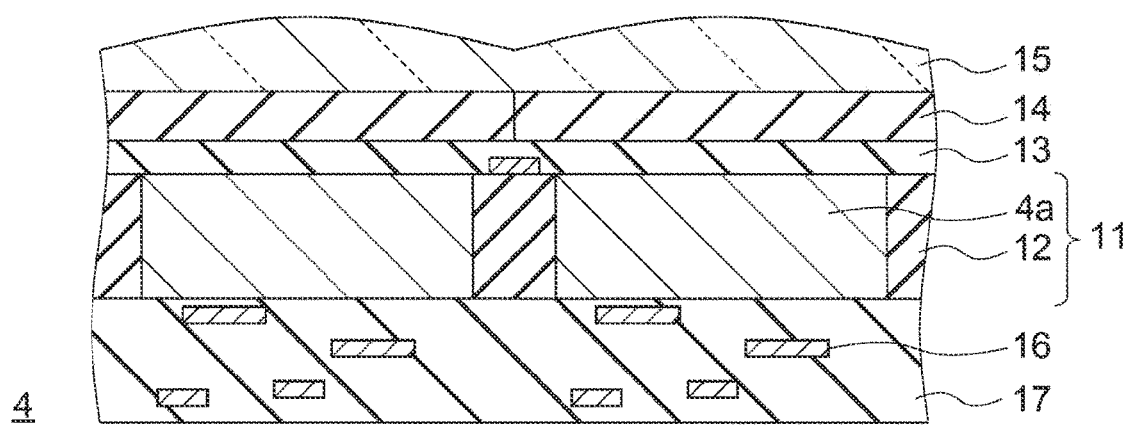
FIG. 3 is a cross-sectional view depicting an example of a cross section structure of an imaging section 4.

FIG. 3 is a cross-sectional view depicting an example of a cross section structure of the imaging section 4. The imaging section 4 in FIG. 3 includes the photoelectric conversion section 4a formed in a semiconductor substrate 11, and the photoelectric conversion section 4a is separated into pixels by an element isolation layer 12. A planarization layer 13 is disposed on the photoelectric conversion section 4a, and a color filter layer 14 is disposed on the planarization layer 13. The color filter layer 14 may include filter layers for three colors of RGB and may include filter layers for cyan, magenta, and yellow corresponding to complementary colors for RGB. Alternatively, the color filter layer 14 may include a filter layer that transmits colors other than visible light, such as infrared light, may include a filter layer having multispectral properties, or may include a filter layer for a subtractive color such as white. Transmitting light other than visible light, such as infrared light, allows sensing information such as depth information to be detected. An on-chip lens 15 is disposed on the color filter layer 14. Light is incident through the on-chip lens 15. In the present description, a side on which the on-chip lens 15 is disposed is referred to as a rear surface side of the imaging section 4.

On a front surface side of the imaging section 4, a read circuit 16 is formed on the semiconductor substrate 11, and an interlayer insulating film 17 is provided around the read circuit 16. The read circuit 16 includes a transfer transistor, a reset transistor, an amplification transistor, and a select transistor. Note that the cross section structure of the imaging section 4 is not limited to the one depicted in FIG. 3.

Figure 4:
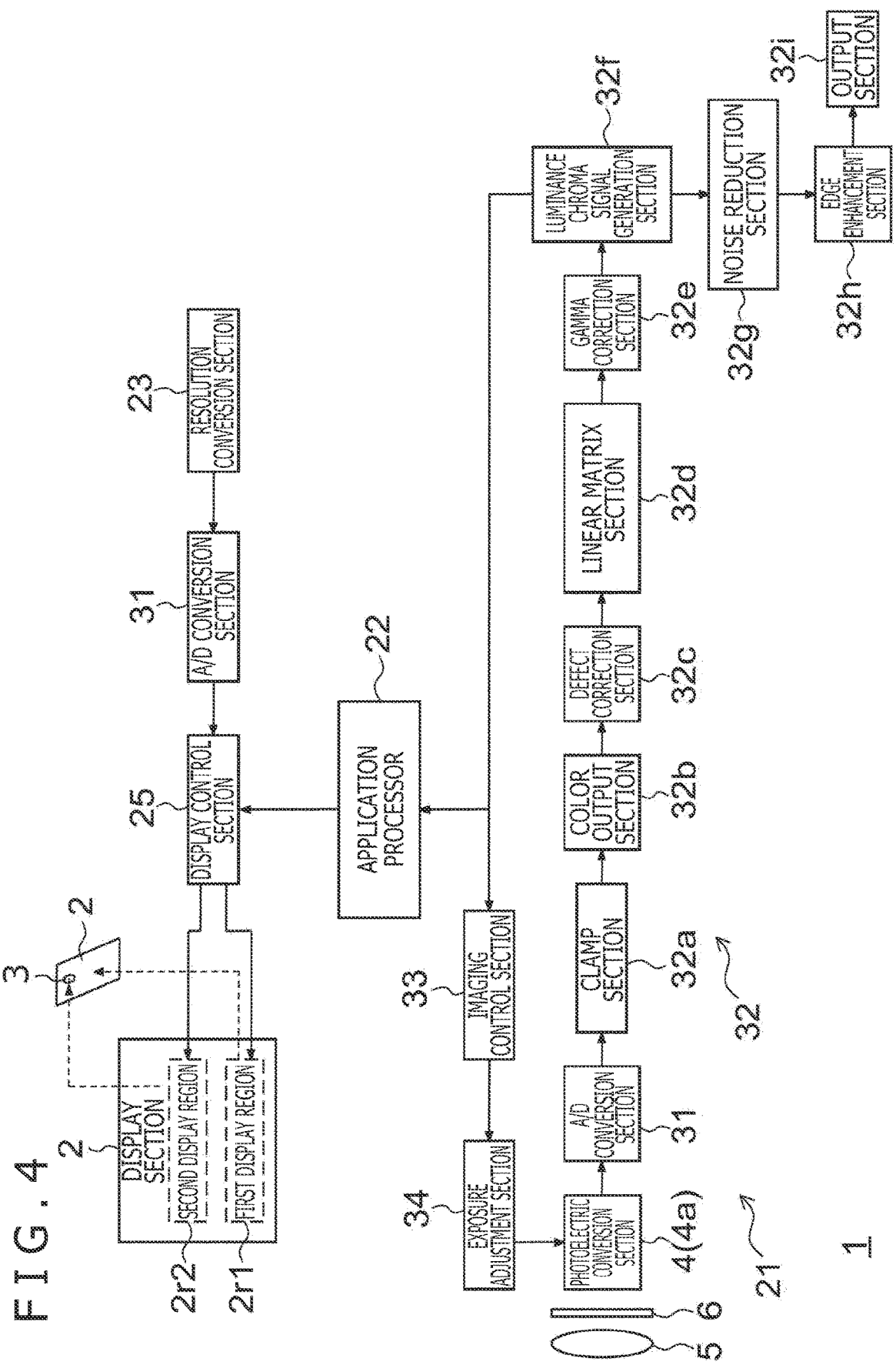
FIG. 4 is a block diagram depicting an internal configuration of the electronic equipment according to the present embodiment.

FIG. 4 is a block diagram depicting an internal configuration of the electronic equipment 1 according to the present embodiment. As depicted in FIG. 4, the electronic equipment 1 includes an imaging apparatus 21, an application processor (first control section) 22, a resolution conversion section 23, an A/D conversion section 24, a display control section 25, and the display section 2.

The imaging apparatus 21 may include one or multiple semiconductor devices, and includes the imaging section 4 (photoelectric conversion section 4a), the optical system 5, and the IR (Infrared Ray) cut filter 6, constituting the camera module 3, as well as an A/D conversion section 31, a signal processing section 32, an imaging control section (second control section) 33, and an exposure adjustment section 34.

The A/D conversion section 31 converts an analog pixel signal obtained by the imaging section 4 into digital pixel data. The signal processing section 32 includes a clamp section 32a, a color output section 32b, a defect correction section 32c, a linear matrix section 32d, a gamma correction section 32e, a luminance chroma signal generation section 32f, a noise reduction section 32g, an edge enhancement section 32h, and an output section 32i.

The clamp section 32a executes processing for defining a black level. More specifically, the clamp section 32a executes processing for subtracting black level data from digital pixel data. The color output section 32b outputs, for example, pixel data for each color of the RGB. The defect correction section 32c corrects imaging data of a specific pixel that could not be correctly read for some reason, by using imaging data of surrounding pixels. The linear matrix section 32d executes a matrix operation on color information such as RGB to more correctly reproduce colors. The gamma correction section 32e performs gamma correction to enable display with high visibility according to the display properties of the display section 2. For example, the gamma correction section 32e performs conversion from 10 bits to 8 bits with gradient changed. The luminous chroma signal generation section 32f generates, in reference to output data from the gamma correction section 32e, a luminance chroma signal to be displayed on the display section 2. The noise reduction section 32g executes processing for reducing noise contained in the luminance chroma signal. The edge enhancement section 32h executes processing for enhancing the edge of a subject image, according to the luminance chroma signal. The noise reduction processing by the noise reduction section 32g and the edge enhancement processing by the edge enhancement section 32h may be executed exclusively in a case where predetermined conditions are satisfied. The output section 32i outputs the luminance chroma signal resulting from the noise reduction processing.

The imaging control section 33 sets, according to the luminance chroma signal, a frame rate at which the imaging section 4 performs imaging. The exposure adjustment section 34 adjusts an exposure time according to the frame rate set by the imaging control section 33. The photoelectric conversion section 4a performs imaging for each pixel according to the exposure time adjusted by the exposure adjustment section 34.

The application processor 22 is a semiconductor device separate from the camera module 3 and is mounted on the same substrate as that on which the camera module 3 is mounted or on another substrate. The application processor 22 internally includes a CPU (Central Processing Unit) and the like and executes programs for an operating system and various pieces of application software. The application processor 22 may be equipped with functions of a CPU (Graphics Processing Unit) and a baseband processor which execute image processing, signal processing, and the like. The application processor 22 executes various types of processing on input image data and operation results as necessary, performs control such that an image is displayed on the display section 2 of the electronic equipment 1, and performs transmission to an external cloud server via a predetermined network.

The application processor 22 transmits and receives various control signals to and from the imaging control section 33. Further, the application processor 22 receives the luminance chroma signal generated by the luminous chroma signal generation section 32f, and supplies the luminance chroma signal to the display control section 25. More specifically, the application processor 22 receives information regarding the frame rate at which the imaging section 4 performs imaging via the imaging control section 33, and sets a frame rate at which the display section 2 displays images.

The application processor 22 and the imaging control section 33 may be integrated in one chip. In the present description, the application processor 22 and the imaging control section 33 may collectively be referred to as a control section. The control section according to the present embodiment synchronizes a display timing of the display section 2 and an imaging timing of the imaging section 4 such that the imaging section 4 performs imaging at a timing when the display section 2 does not perform displaying.

The control section sets a longer period of time in which the display section 2 does not perform displaying, when the imaging section 4 performs imaging than in a case where the imaging section 4 does not perform imaging. Moreover, the control section may set a lower frequency at which at least some of the pixels in the display section 2 are displayed when the imaging section 4 performs imaging than in the case where the imaging section 4 does not perform imaging. Further, the control section may set a lower frame rate for the display section 2 when the imaging section 4 performs imaging than in the case where the imaging section 4 does not perform imaging. Further, the control section may set a lower display frequency for at least some of the horizontal pixel lines in the display section 2 when the imaging section 4 performs imaging than in the case where the imaging section 4 does not perform imaging. In addition, the control section may set a lower display frequency for at least some horizontal pixel lines when the imaging section 4 performs imaging than in the case where the imaging section 4 does not perform imaging, the horizontal pixel lines including a display region overlapping the imaging section 4 when the display section 2 is viewed in plan from a normal direction of the display surface 1a. Further, the control section may set an exposure time for the imaging section 4 according to the period of time in which the display section 2 does not perform displaying. In addition, the control section may set a lower display pixel density for at least a partial display region of the display section 2 when the imaging section 4 performs imaging than in the case where the imaging section 4 does not perform imaging. Further, the control section may set a lower display pixel density for a partial display region when the imaging section 4 performs imaging than in the case where the imaging section 4 does not perform imaging, the partial display region including a display region overlapping the imaging section 4 when the display section 2 is viewed in plan from the normal direction of the display surface 1a. Further, the control section may set a higher luminance value for the pixels in at least a partial display region of the display section 2 when the imaging section 4 performs imaging than in the case where the imaging section 4 does not perform imaging. In addition, the control section may set a higher luminance value for a partial display region when the imaging section 4 performs imaging than in the case where the imaging section 4 does not perform imaging, the partial display region including a display region overlapping the imaging section 4 when the display section 2 is viewed in plan from the normal direction of the display surface 1a. Further, the control section may set a lower frequency and a higher luminance value at which at least some of the pixels in the display section 2 are displayed when the imaging section 4 performs imaging than in the case where the imaging section 4 does not perform imaging.

The resolution conversion section 23 converts the resolution of a video signal to be displayed on the display section 2. The A/D conversion section 31 converts, into digital video data, the video signal with the resolution converted by the resolution conversion section 23. The display control section 25 performs control such that the digital video data is displayed on the display section 2 at a frame rate corresponding to an instruction from the application processor 22.

Figure 5:
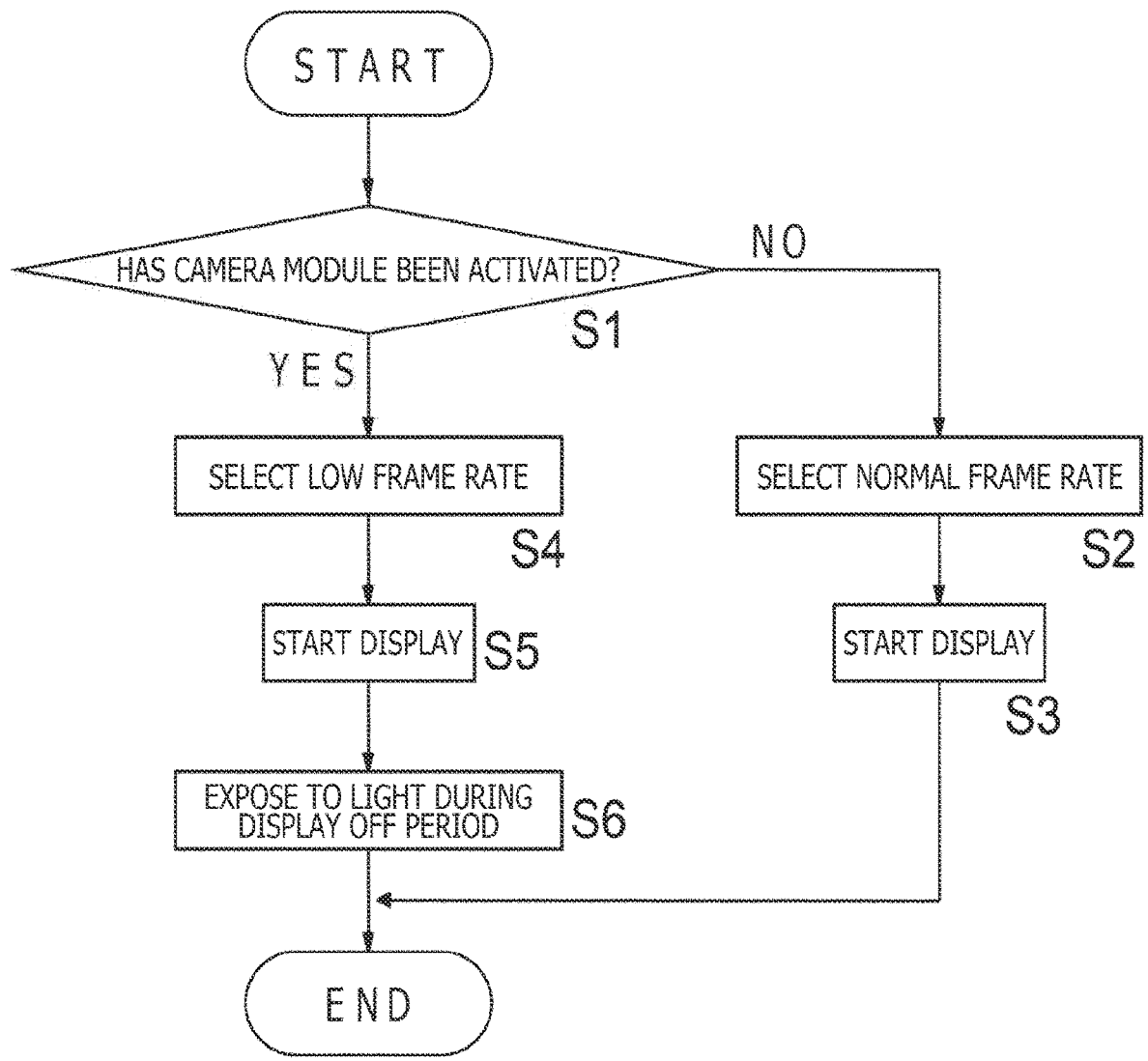
FIG. 5 is a flowchart depicting a processing operation of the electronic equipment according to the first embodiment.

FIG. 5 is a flowchart depicting processing operations of the electronic equipment 1 according to a first embodiment, and depicts the processing operations executed by the application processor 22 and the imaging control section 33, for example. The flowchart in FIG. 5 is continuously repeated while the electronic equipment 1 is powered on.

First, a user of the electronic equipment 1 determines whether or not the camera module 3 has been activated (step S1). In a case where the camera module 3 has not been activated, a normal frame rate is selected (step S2). The normal frame rate is a predetermined frame rate, for example, 60 Hz or the like. Note that the frame rate is a frequency required for displaying the entire display region of the display section 2 once. Then, the display on the display section 2 is initiated at the normal frame rate (step S3).

On the other hand, in step S1, in a case where the camera module 3 is determined to have been activated, a low frame rate is selected (step S4). The low frame rate is a frame rate lower than the normal frame rate, for example, 30 Hz or the like. In an example in FIG. 5, the low frame rate is set to a fixed frequency. However, the frequency of the low frame rate may be variable. Then, the display on the display section 2 is initiated at the low frame rate (step S5).

In a case where the display section 2 performs display at a constant frame rate, the length of the period in which the display section 2 does not perform display (hereinafter referred to as a display off period) varies according to the frequency of the frame rate. The display off period increases with quickened frame rate. The display off period is provided between the end of display of one horizontal pixel line and the start of display of the next horizontal pixel line or between the end of display of one frame and the start of display of the next frame.

After display is initiated in step S5, during the display off period, the imaging section 4 performs exposure (step S6). The exposure time of the imaging section 4 is determined according to the length of the display off period. The display off period increases with decreasing frame rate, and thus display at a lower frame rate enables extension of the exposure time.

Figure 6:
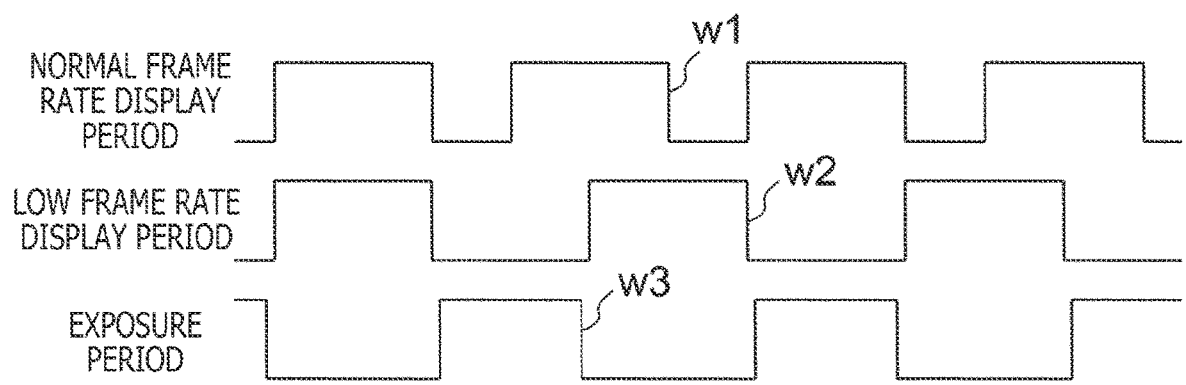
FIG. 6 is an operation timing diagram corresponding to the flowchart in FIG. 5.

FIG. 6 is an operation timing diagram corresponding to the flowchart in FIG. 5. A waveform w1 in FIG. 6 is a signal waveform indicating display periods at the normal frame rate, and a waveform w2 in FIG. 6 is a signal waveform indicating display periods at the low frame rate. High periods of the waveforms w1 and w2 indicate display periods, and low periods of the waveforms w1 and w2 indicate display off periods. A waveform w3 is a signal waveform indicating exposure periods, and high periods are the exposure periods. As depicted by the waveforms w1 to w3, the low frame rate involves longer display off periods than the normal frame rate, allowing a sufficient exposure time to be provided.

In the first embodiment, as depicted in FIGS. 5 and 6, the imaging section 4 performs imaging during the display off periods, and thus the image quality of captured images is unlikely to be degraded under the effect of display luminance of the display section 2. Further, when imaging is performed, display is provided at the low frame rate, thus enabling extension of the display off period. Consequently, a sufficiently long exposure time can be provided during imaging, preventing a problem in which an insufficient exposure time leads to dark captured images. In other words, imaging sensitivity can be improved.

Second Embodiment

When the frame rate of the display section 2 is reduced during activation of the camera module 3 as in the first embodiment, human eyes perceive the display to be darker than the normal display because the eyes sense brightness according to an averaged luminance. Thus, in a second embodiment, the luminance value of pixel data is increased when the camera module 3 is activated.

Figure 7:
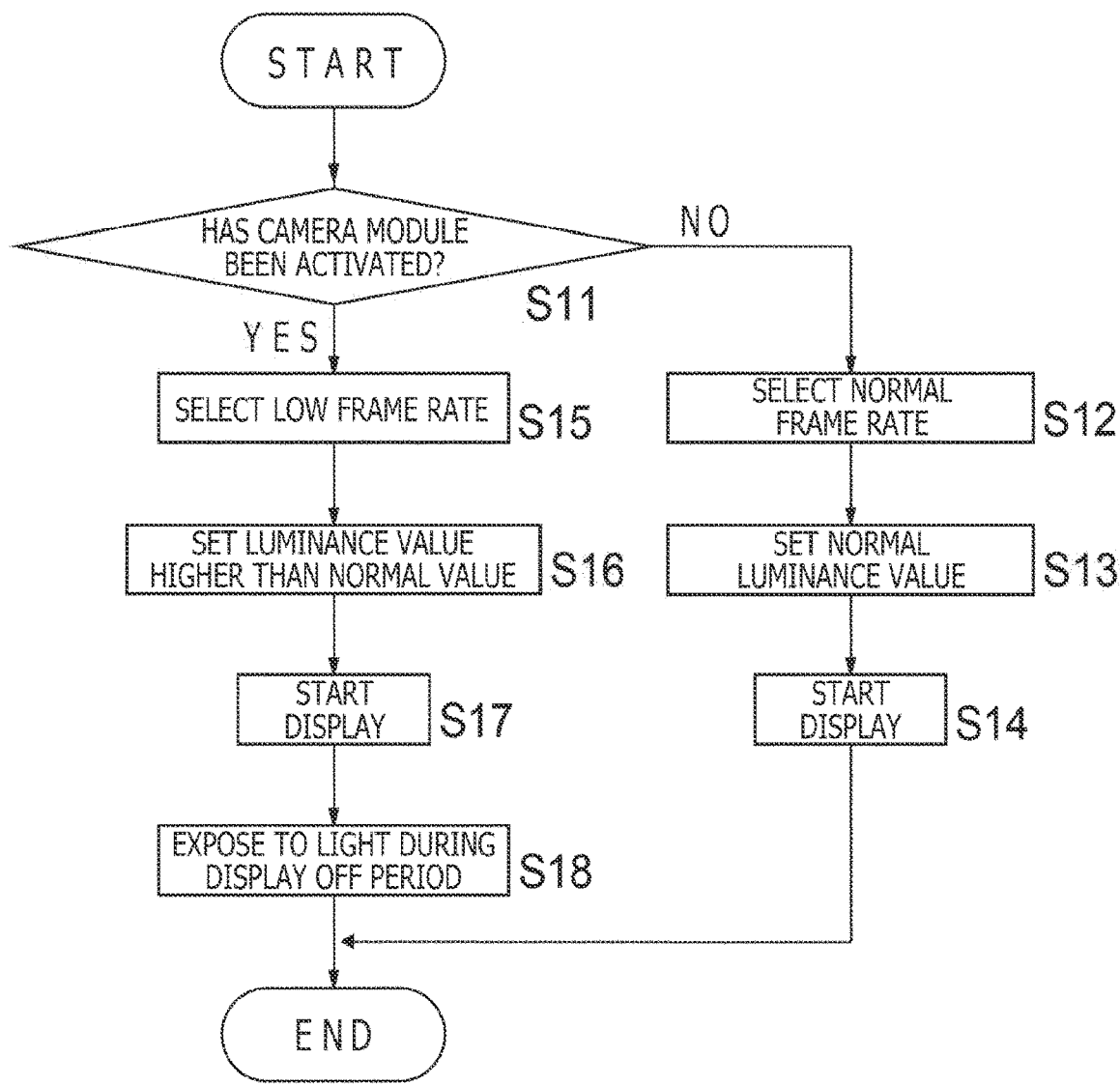
FIG. 7 is a flowchart depicting a processing operation of the electronic equipment according to a second embodiment.

The electronic equipment 1 according to the second embodiment has an internal configuration similar to that in FIG. 4. FIG. 7 is a flowchart depicting processing operations of the electronic equipment 1 according to the second embodiment. Differences from the flowchart in FIG. 5 will mainly be described below. In FIG. 7, in a case where the camera module 3 has not been activated (NO in step S11), around the time of performing processing for selecting the normal frame rate (step S12), a normal luminance value is set (step S13). The normal luminance value means performing display with the original luminance value of pixel data unchanged. Then, pixel data with a set display luminance is supplied to the display section 2 at the normal frame rate, initiating display (step S14).

On the other hand, in a case where the camera module 3 is activated (YES in step S11), then around the time of performing processing for selecting the low frame rate (step S15), a luminance value higher than the normal luminance value is set (step S16). The luminance value higher than the normal luminance value means adjusting the luminance value of the pixel data such that human eyes sense a display luminance equivalent to that set during display on the display section 2 at the normal frame rate when the camera module 3 is not activated. More specifically, in step S16, the luminance value of the pixel data is increased above the luminance value set in step S13.

Then, display is initiated at the luminance value set in step S16 (step S17). By increasing the luminance value of the pixel data, even with a decreased frame rate, human eyes sense a display luminance equivalent to that set when the normal frame is selected. Hence, in the display off period, the imaging section 4 performs imaging during the exposure time corresponding to the length of the display off period (step S18).

Figure 8:
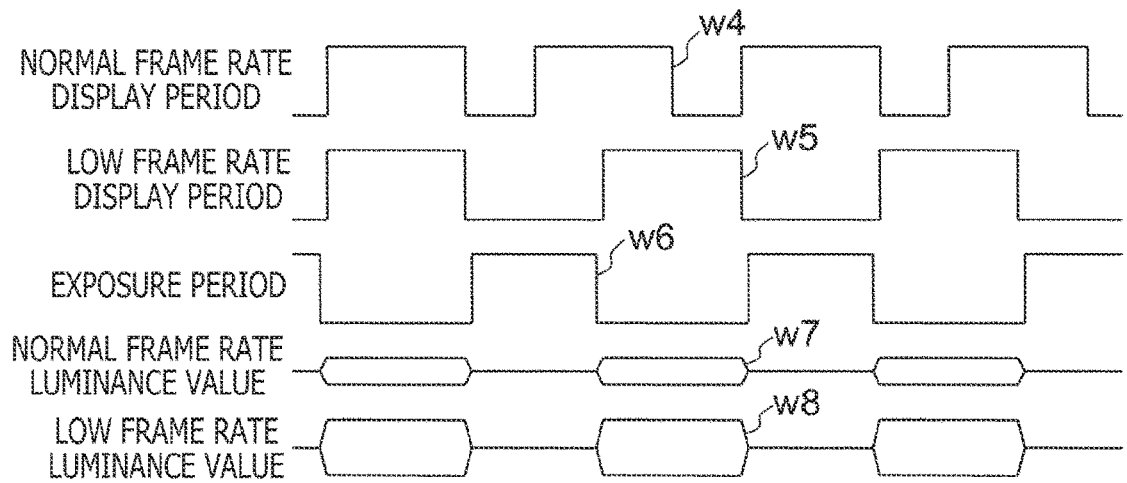
FIG. 8 is an operation timing diagram corresponding to the flowchart in FIG. 7.

FIG. 8 is an operation timing diagram corresponding to the flowchart in FIG. 7. Waveforms w4 to w6 are similar to the waveforms w1 to w3. A waveform w7 schematically represents the luminance value of the pixel data displayed on the display section 2 when the camera module 3 is not activated. A waveform w8 schematically represents the luminance value of the pixel data displayed on the display section 2 when the camera module 3 is activated.

As can be recognized from the waveforms w7 and w8, in a case where the low frame rate is selected, an increased luminance value of the pixel data allows the display luminance sensed by human eyes to be made equivalent to the display luminance that is set when the normal frame rate is selected.

As described above, in the second embodiment, when the camera module 3 is activated, not only is the frame rate of the display section 2 decreased but also the luminance value of the pixel data is set higher than when the normal frame rate is selected. Thus, when the camera module 3 is activated, the display on the display section 2 is not perceived to be dark and does not give a sense of discomfort. Further, the imaging section 4 performs imaging during the display off period as in the first embodiment, so that a sufficient exposure time can be used to perform imaging without the effects of display on the display section 2.

Third Embodiment

A third embodiment not only reduces the frame rate but also controls the display pixel density when the camera module 3 is activated. The electronic equipment 1 according to the third embodiment has an internal configuration similar to that in FIG. 4.

Figure 9:
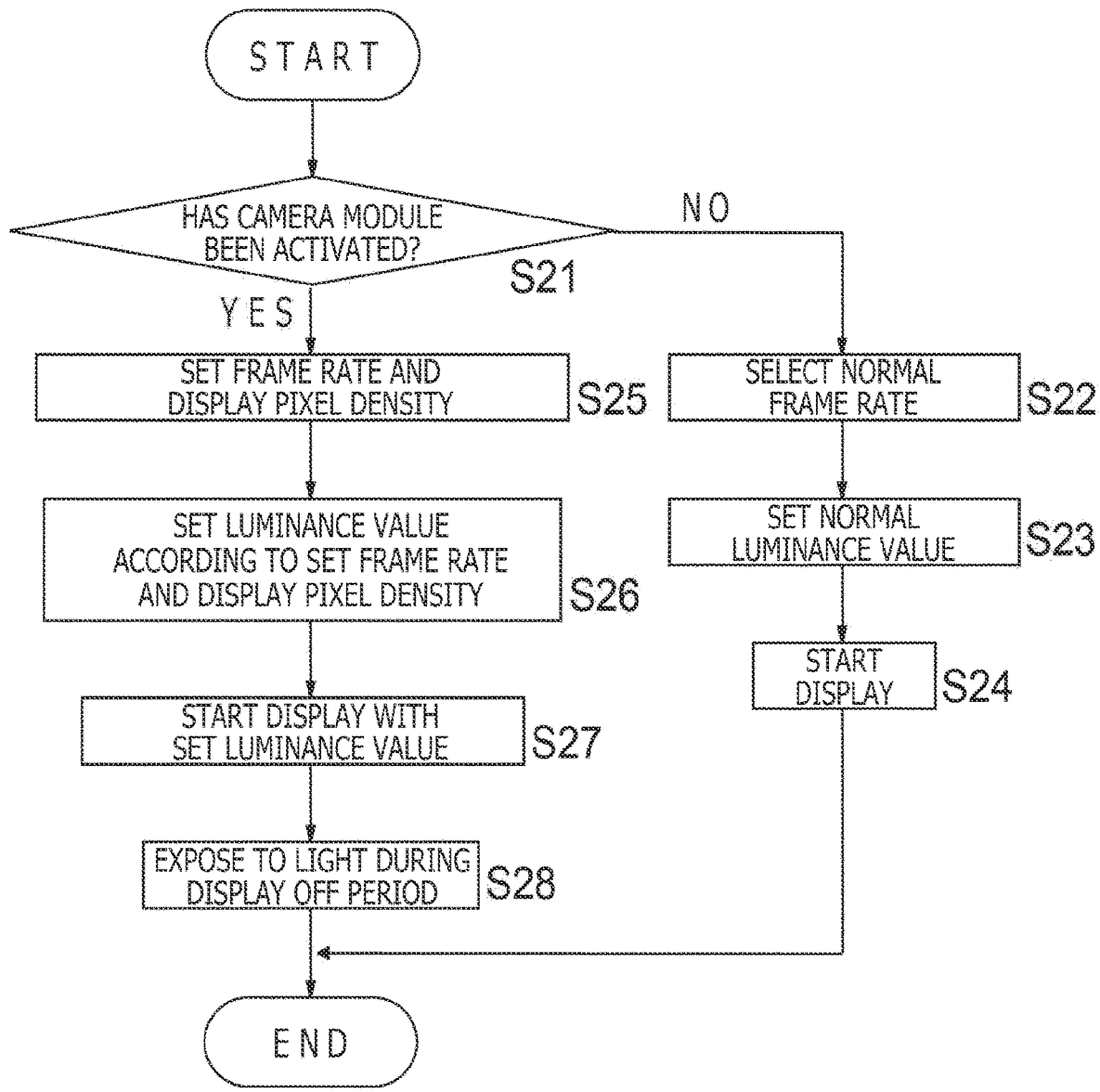
FIG. 9 is a flowchart depicting a processing operation of the electronic equipment according to a third embodiment.

FIG. 9 is a flowchart depicting processing operations of the electronic equipment 1 according to the third embodiment. Differences from FIG. 7 will mainly be described below. Processing in steps S21 to S24 is similar to that in steps S11 to S14 in FIG. 7.

In a case where the camera module 3 is activated, the frame rate and the display pixel density are set (step S25). In this regard, the low frame rate, which is lower than the normal frame rate, is set. Further, for the display pixel density, set is a display pixel density that is lower than the display pixel density set in a case where the camera module 3 is not activated. As a more specific example, in a case where the camera module 3 is activated, every other horizontal pixel line or every two horizontal pixel lines are selectively driven to reduce the display pixel density. This enables an increase in the display off period between the end of display of one horizontal pixel line and the start of display of the next horizontal pixel line. Alternatively, driving is performed with multiple pixels on the horizontal pixel line decimated. This increases the interval for which the pixels on the horizontal pixel line are driven, thus enabling the display off period to be set within the interval and the imaging section 4 to perform imaging during the display off period.

Then, the luminance value of the pixel data is set according to the set frame rate and display pixel density (step S26). A higher display pixel density increases the display luminance sensed by human eyes. Further, a lower frame rate reduces the display luminance that can be sensed by human eyes. Hence, in step S26, with both the set frame rate and the set display pixel density taken into account, the luminance value of the pixel data is set to be equivalent to the display luminance of the display section 2 when the camera module 3 is not activated.

Next, display is initiated at the set luminance value (step S27). Then, in the display off period, the imaging section 4 performs imaging during the exposure time corresponding to the length of the display off period (step S28).

Figure 10:
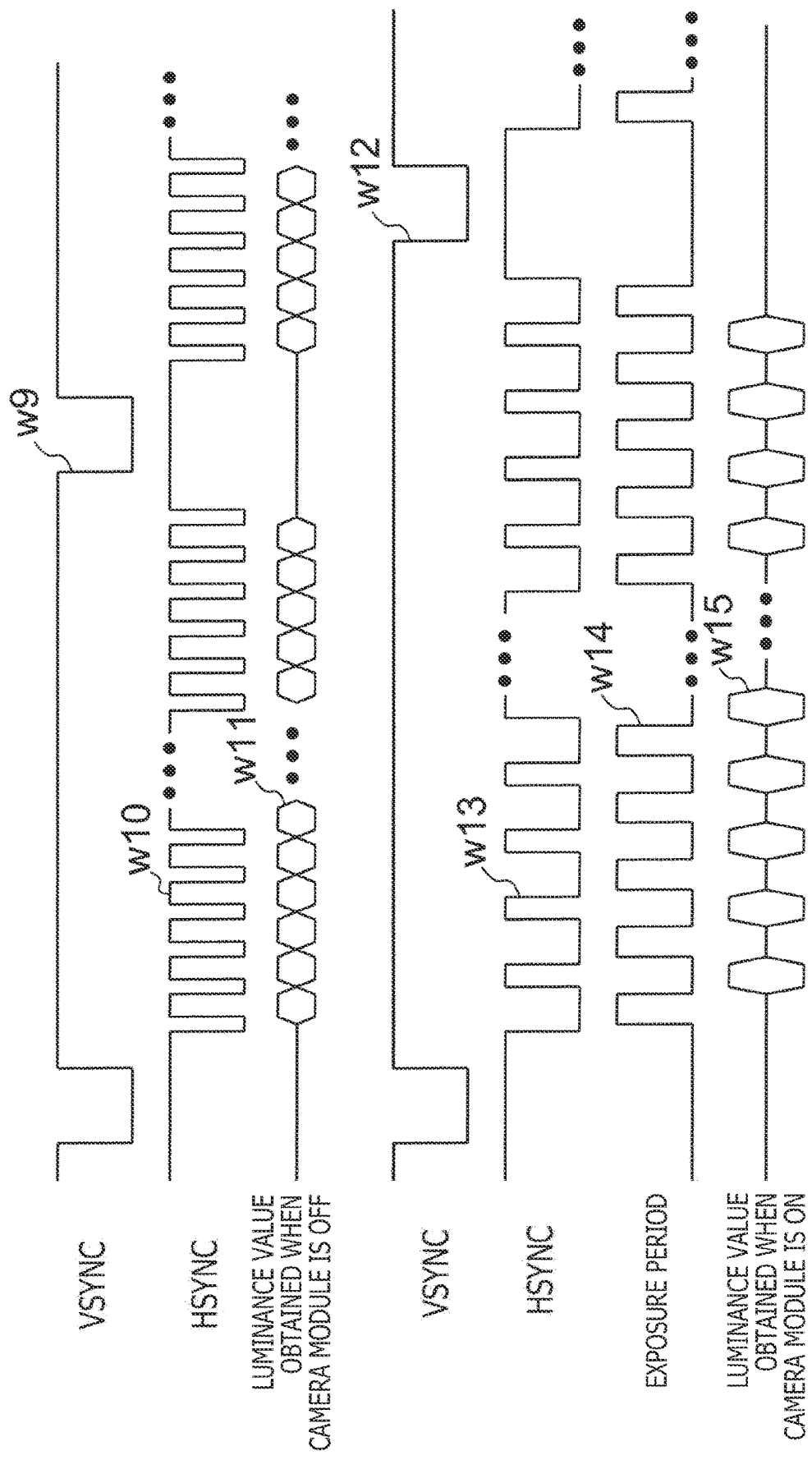
FIG. 10 is an operation timing diagram corresponding to the flowchart in FIG. 9.

FIG. 10 is an operation timing diagram corresponding to the flowchart in FIG. 9. A waveform w9 is the waveform of a vertical synchronization signal VSYNC at the normal frame rate, a waveform w10 is the waveform of a horizontal synchronization signal HSYNC at the normal frame rate, and a waveform w11 schematically represents the luminance value of the pixel data displayed on the display section 2 at the normal frame rate. High periods of the horizontal synchronization signal HSYNC of the waveform 10 correspond to horizontal pixel line display periods. A waveform w12 is the waveform of the vertical synchronization signal VSYNC at the low frame rate, a waveform w13 is the waveform of the horizontal synchronization signal HSYNC at the low frame rate, a waveform w14 is the waveform of the exposure time during which the imaging section 4 performs imaging, and a waveform w15 schematically represents the luminance value of the pixel data displayed on the display section 2 at the low frame rate.

As depicted in FIG. 10, in a case where the camera module 3 is activated, the low frame rate, which is lower than the normal frame rate, is selected, and the display pixel density is also reduced. This enables extension of the display off period, allowing extension of the exposure time during which the imaging section 4 performs imaging.

Figure 11:
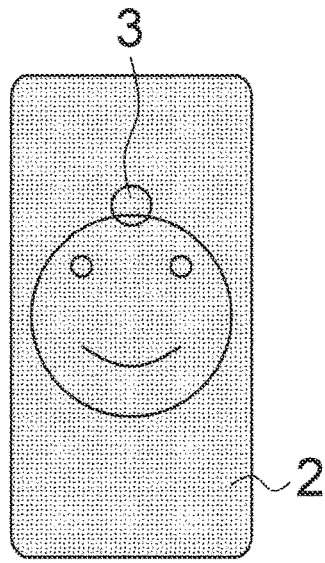
FIG. 11 is a diagram depicting a screen display example of a display section 2 provided by the processing in the flowchart in FIG. 10.

FIG. 11 illustrates a display example of a screen of the display section 2 displayed by processing in the flowchart in FIG. 10. In the present embodiment, when the camera module 3 is activated, the frame rate and the display pixel density are set for each frame. Hence, as in FIG. 11, the entire display region of the display section 2 is displayed at a display pixel density different from that set when the camera module 3 is not activated. However, by setting a larger luminance value for the pixel data when the camera module 3 is activated than when the camera module 3 is not activated, the display luminance sensed by human eyes can be made equivalent to that set when the camera module 3 is not activated.

As described above, in the third embodiment, in a case where the camera module 3 is activated, the frame rate and the display pixel density are set in units of frames. Thus, imaging can be performed with the frame rate and the display pixel density reduced for the entire display region of the display section 2. Reducing the frame rate and the display pixel density enables extension of the exposure time during which the imaging section 4 performs imaging, allowing imaging sensitivity to be improved.

Fourth Embodiment

A fourth embodiment controls the display pixel density for some horizontal pixel lines.

The electronic equipment 1 according to the fourth embodiment has an internal configuration similar to that in FIG. 4. However, the display section 2 in the electronic equipment 1 includes a first display region 2r1 and a second display region 2r2. The first display region 2r1 is a region displayed at the normal frame rate and the normal display pixel density. The second display region 2r2 is a region displayed at the low frame rate and a display pixel density lower than the normal display pixel density.

The second display region 2r2 is a display region including a display region overlapping the camera module 3 when the display section 2 is viewed in plan from the normal direction of the display surface 1a. The second display region 2r2 according to the present embodiment has a band-like area that is an integral multiple of the horizontal pixel line in the display section 2. At least a part of the second display region 2r2 overlaps the arrangement location of the imaging section 4 in the front to back direction. Reducing the display pixel density of the second display region 2r2 allows a longer display off period to be set for the second display region 2r2.

Figure 12:
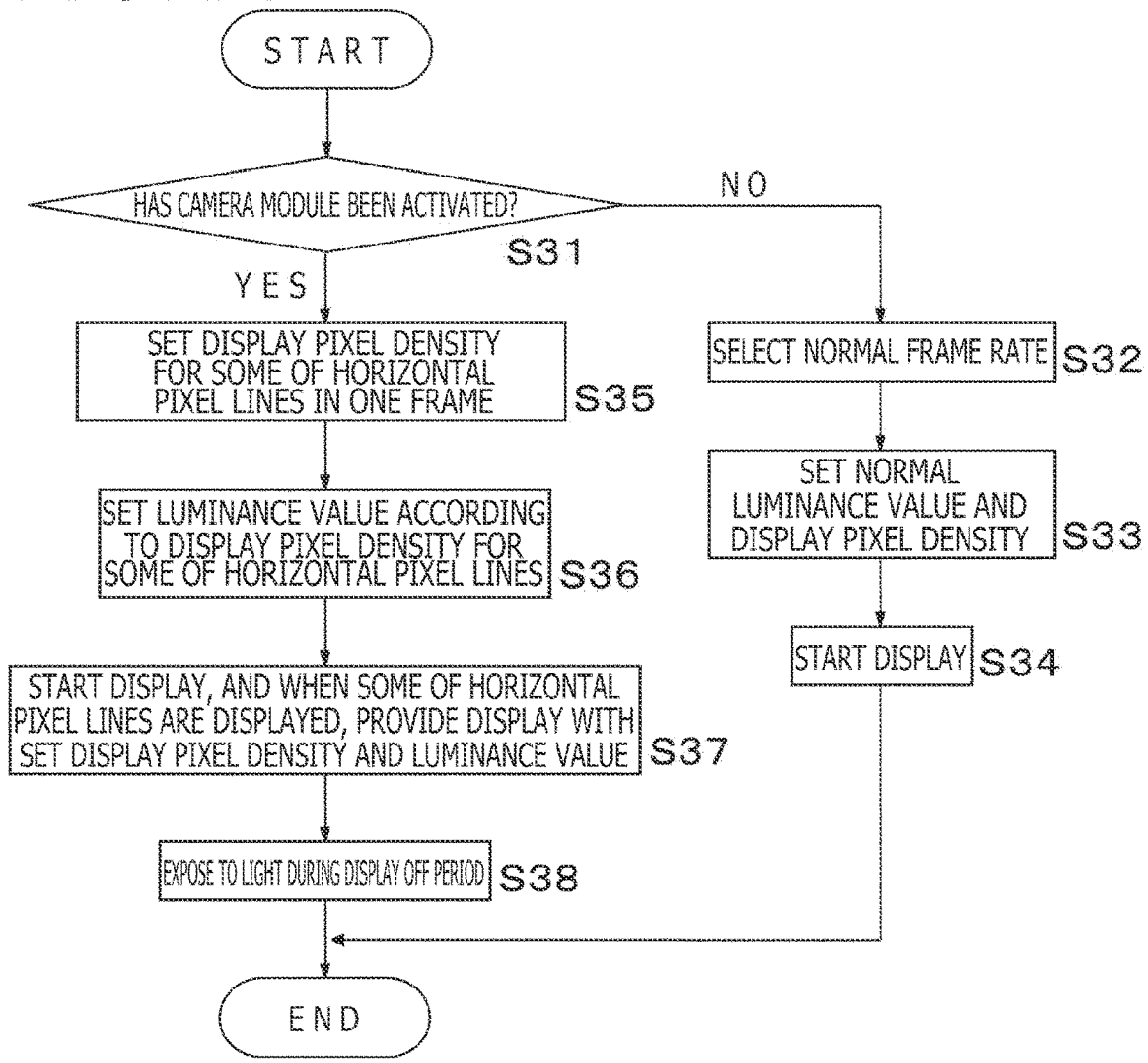
FIG. 12 is a flowchart depicting a processing operation of the electronic equipment according to a fourth embodiment.

FIG. 12 is a flowchart depicting processing operations of the electronic equipment 1 according to the fourth embodiment, and depicts, for example, processing operations executed by the application processor 22 and the imaging control section 33. Differences from the flowchart in FIG. 9 will mainly be described below. In steps S31 to S34 in FIG. 12, processing similar to that in steps S21 to S24 in FIG. 9 is executed. In a case where the camera module 3 is activated, the display pixel density is set for some of the horizontal pixel lines within one frame (step S35). Some of the horizontal pixel lines refer to horizontal pixel lines included in the second display region 2r2 described above. The number of the horizontal pixel lines is not limited to any number, but in view of the size of the camera module 3, multiple horizontal pixel lines are included in the second display region 2r2. The display pixel density set in step S35 is set to, for example, a value smaller than the display pixel density that is set when the camera module 3 is not activated. More specifically, the display pixel density is reduced by decimating multiple horizontal pixel lines within the second display region 2r2 for driving. Reducing the display pixel density enables an increase of the display off period of the second display region 2r2, allowing a longer exposure time to be set.

Next, the luminance value of the pixel data is set according to the display pixel density of the second display region 2r2 (step S36). A reduced display pixel density leads to dark display, and thus the luminance value of the pixel data is increased to make the display luminance sensed by human eyes equal to the display luminance that is set when the camera module 3 is not activated. Then, when display is initiated to display some of the horizontal pixel lines, that is, when the second display region 2r2 is displayed, the set display pixel density and luminance value are used for the display (step S37).

Subsequently, in the display off period of the second display region 2r2, the imaging section 4 performs imaging during the exposure time determined by the display pixel density in step S35 (step S38).

FIG. 13 is an operation timing diagram corresponding to the flowchart in FIG. 12. A waveform w16 is the waveform of the vertical synchronization signal VSYNC, a waveform w17 is the waveform of the horizontal synchronization signal HSYNC, a waveform w18 represents the exposure period, and a waveform w19 schematically represents the luminance value of the pixel data displayed on the display section 2. High periods of the waveform w17 correspond to display periods of the horizontal pixel lines.

In an example in FIG. 13, the display pixel density is adjusted by making only some of the horizontal pixel line display periods within one frame longer than the other horizontal pixel line display periods. In other words, for the horizontal pixel lines within the second display region 2r2, every other horizontal pixel line or every two horizontal pixel lines are driven to reduce the display pixel density. Further, the luminance value of the pixel data is increased during the display period of the horizontal pixel lines in the second display region 2r2.

Figure 14A:
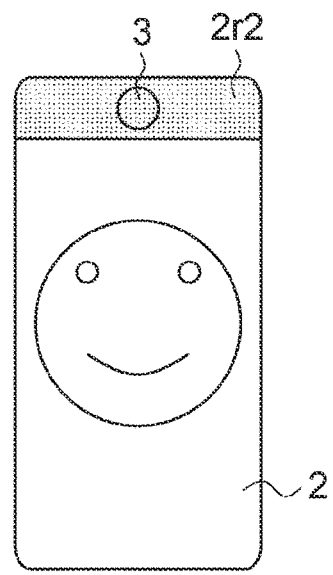
FIG. 14A is a diagram schematically depicting a specific example of a second display region according to the fourth embodiment.
Figure 14B:
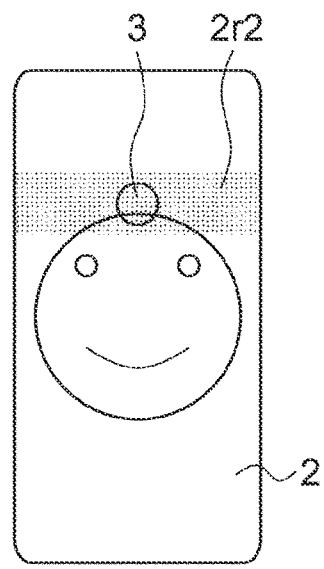
FIG. 14B is a diagram schematically depicting a specific example of the second display region according to the fourth embodiment.
Figure 14C:
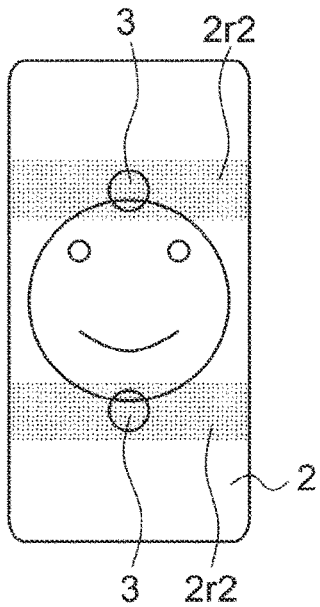
FIG. 14C is a diagram schematically depicting a specific example of the second display region according to the fourth embodiment.

FIG. 14A, FIG. 14B, and FIG. 14C are diagrams schematically depicting specific examples of the second display region 2r2. FIG. 14A depicts an example in which the camera module 3 is present at an upper end of the display section 2, and the second display region 2r2 including the arrangement location of the camera module 3 is provided like a band in the horizontal direction. FIG. 14B depicts an example in which the camera module 3 is present closer to the center of the display section 2 than in FIG. 14A, and the second display region 2r2 including the arrangement location of the camera module 3 is provided like a band in the horizontal direction. In FIG. 14C, two camera modules 3 are disposed, and two second display regions 2r2, each including the arrangement location of the camera module 3, are provided like bands in the horizontal direction.

As described above, in the fourth embodiment, the display pixel density can be adjusted in units of horizontal pixel lines in the display section 2. Thus, when the camera module 3 is activated, adjusting the display pixel density of the second display region 2r2 having a band shape and extending in the horizontal direction in alignment with the arrangement location of the camera module 3 allows extension of the exposure time during which the imaging section 4 performs imaging during the display off period of the second display region 2r2.

Fifth Embodiment

The electronic equipment 1 according to a fifth embodiment is configured to adjust the display pixel density of the display region corresponding to the external size of the camera module 3 disposed on the rear surface side of the display section 2.

The electronic equipment 1 according to the fifth embodiment has an internal configuration similar to that in FIG. 4. Further, the display section 2 includes the first display region 2r1 and the second display region 2r2 as in the fourth embodiment. Whereas the second display region 2r2 according to the fourth embodiment is a region corresponding to multiple horizontal pixel lines, the second display region 2r2 according to the present embodiment is a pixel block region including multiple pixels disposed adjacent to one another in the horizontal direction and the vertical direction. The second display region 2r2 according to the present embodiment includes some of the pixels in multiple horizontal pixel lines.

Figure 15:
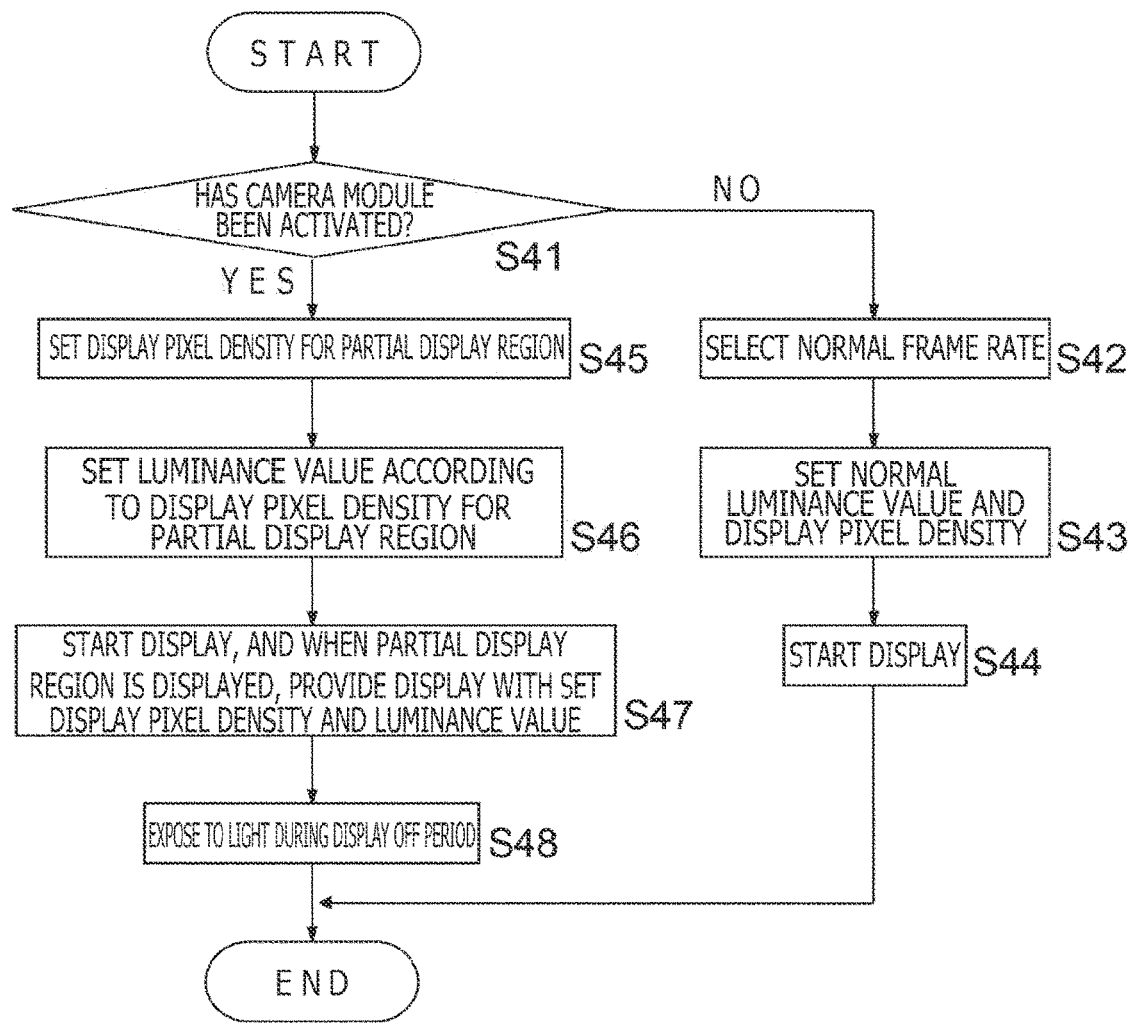
FIG. 15 is a flowchart depicting a processing operation of the electronic equipment according to a fifth embodiment.

FIG. 15 is a flowchart depicting processing operations of the electronic equipment 1 according to the fifth embodiment, and depicts, for example, processing operations executed by the application processor 22. Differences from the flowchart in FIG. 12 will mainly be described below. In steps S41 to S44 in FIG. 15, processing similar to that in steps S31 to S34 in FIG. 12 is executed. In a case where the camera module 3 is activated, the display pixel density is set for a partial display region, that is, the second display region 2r2 (step S45). In this case, the display pixel density may be determined in advance or optionally set according to surrounding brightness or the like as described below.

Next, according to the display pixel density set in step S45, the luminance value of the pixel data is set such that the display luminance sensed by human eyes is equivalent to the display luminance set when the camera module 3 is not activated (step S46).

Then, when display is initiated to display the second display region 2r2, the set display pixel density and the set luminance value are used for the display (step S47). In the present embodiment, even in a case where the camera module 3 is activated, when the first display region 2r1 is displayed, a display pixel density and a luminance value equivalent to those set when the camera module 3 is not activated are used for the display. On the other hand, when the second display region 2r2 is displayed, the display pixel density and the luminance value set in steps S45 and S46 are used for the display.

Subsequently, the imaging section 4 performs imaging during the display off period in the midst of display of the second display region 2r2 (step S48). The exposure time in this case is a time corresponding to the length of the display off period.

Figure 16:
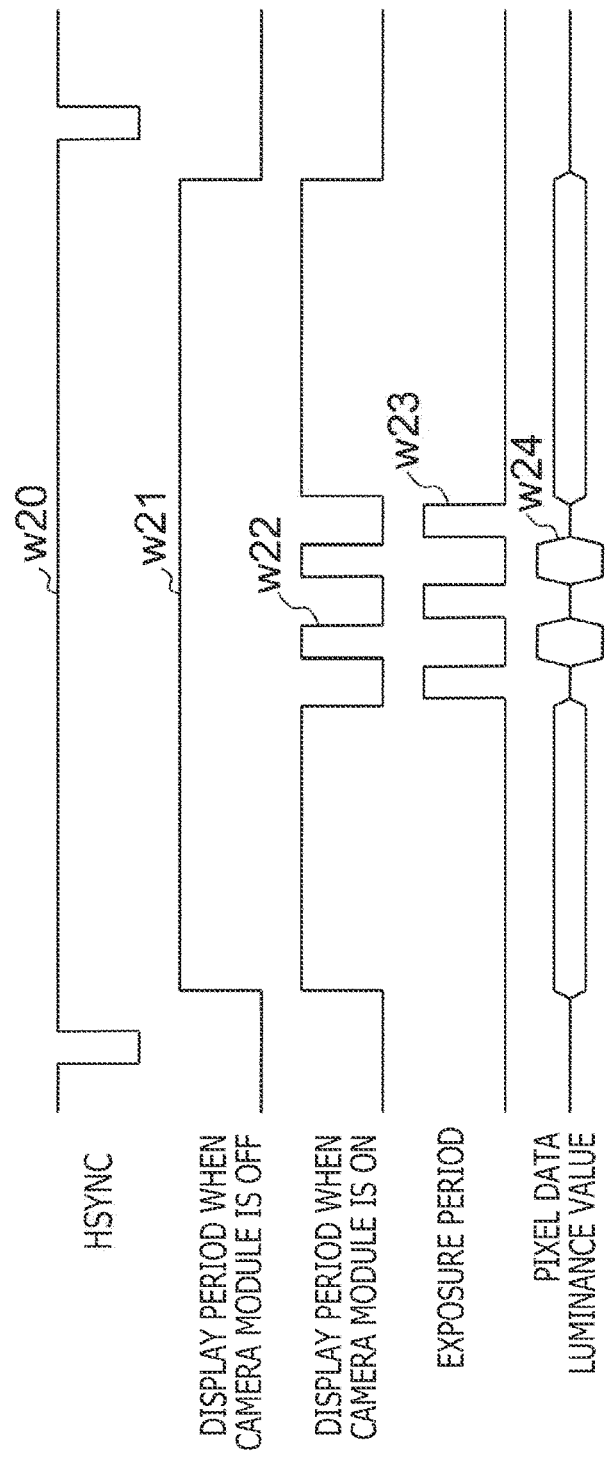
FIG. 16 is an operation timing diagram corresponding to the flowchart in FIG. 15.

FIG. 16 is an operation timing diagram corresponding to the flowchart in FIG. 15. A waveform w20 represents the horizontal synchronization signal HSYNC, a waveform w21 represents the display period of horizontal pixel lines displayed when the camera module 3 is not activated, a waveform w22 represents the display period of horizontal pixel lines displayed when the camera module 3 is activated, a waveform w23 represents the exposure period that is set when the camera module 3 is activated, and a waveform w24 represents the luminance value of the pixel data.

As depicted in FIG. 16, in the present embodiment, at the time of displaying the second display region 2r2, which is provided at a position overlapping the arrangement location of the camera module 3, the display pixel density is reduced to extend the display off period. Consequently, the imaging section 4 can perform imaging during the display off period.

Figure 17A:
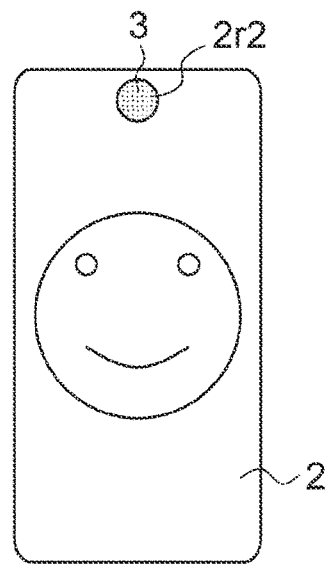
FIG. 17A is a diagram schematically depicting a specific example of a second display region according to the fifth embodiment.
Figure 17B:
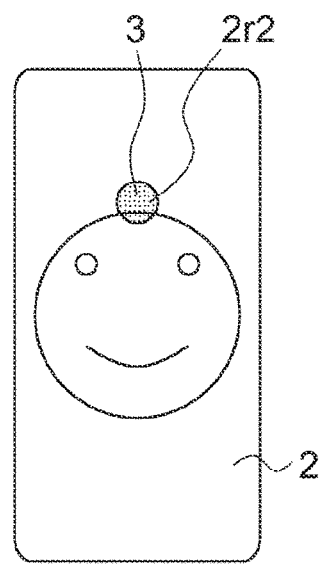
FIG. 17B is a diagram schematically depicting a specific example of the second display region according to the fifth embodiment.

FIGS. 17A and 17B schematically depict a specific example of the second display region 2r2 that is set when the camera module 3 is activated. FIG. 17A depicts an example in which the camera module 3 is disposed on an upper end side of the display section 2, and FIG. 17B depicts an example in which the camera module 3 is disposed close to the center of the display section 2. In the case of FIGS. 17A and 17B, the second display region 2r2 is provided according to the external shape of the camera module 3, and the display pixel density is reduced when the second display region 2r2 is displayed. However, adjusting the display luminance allows suppression of a difference in display luminance sensed by human eyes between the second display region 2r2 and the first display region 2r1 surrounding the second display region 2r2.

As described above, in the fifth embodiment, the second display region 2r2 is set at a location overlapping the arrangement location of the camera module 3, and the display pixel density of the second display region 2r2 and the luminance value of the pixel data are adjusted. Thus, the imaging section 4 can perform imaging without the effects of the display on the display section 2, allowing the image quality of captured images to be improved. Further, compared to the fourth embodiment, the fifth embodiment enables a reduction of the area of the second display region 2r2, making the second display region 2r2 less noticeable and giving no sense of discomfort.

Sixth Embodiment

A sixth embodiment is configured to control the frame rate according to the surrounding brightness.

Figure 18:
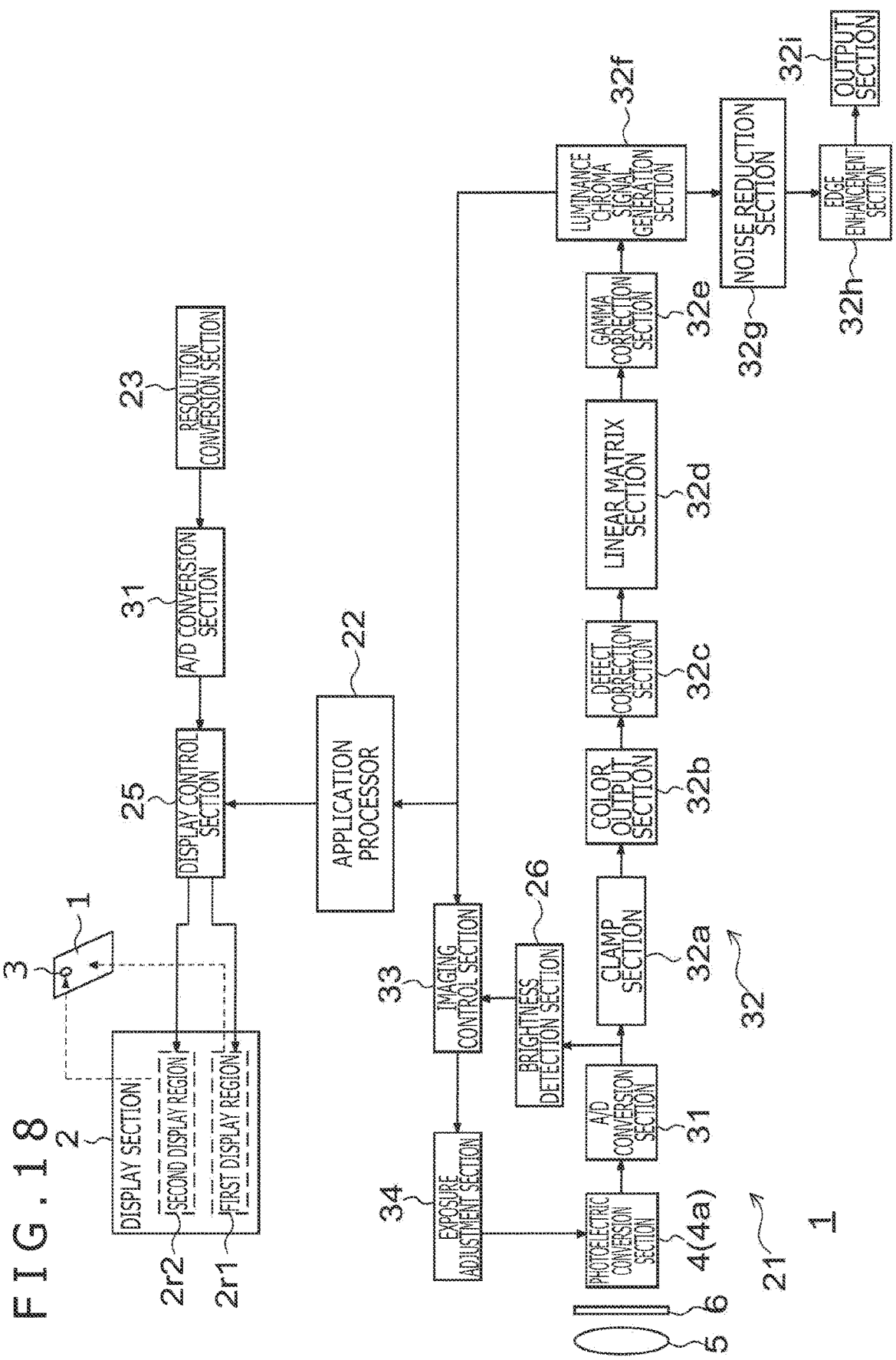
FIG. 18 is a block diagram depicting an internal configuration of electronic equipment according to a sixth embodiment.

FIG. 18 is a block diagram depicting an internal configuration of the electronic equipment 1 according to the sixth embodiment. The electronic equipment 1 in FIG. 18 includes a brightness detection section 26 in addition to the internal configuration of the electronic equipment 1 in FIG. 4. The brightness detection section 26 detects the average brightness of light incident on the photoelectric conversion section 4a in reference to the digital pixel data output from the A/D conversion section 31, for example, or detects brightness based on an integrated value for incident light. The brightness detection section 26 can detect the surrounding brightness of the electronic equipment 1. Alternatively, the brightness detection section 26 may include a sensor that detects brightness, separately from the imaging section 4.

The imaging control section 33 and the application processor 22 set the frame rate of the display section 2 and the exposure time of the imaging section 4 in reference to information regarding the brightness detected by the brightness detection section 26. For example, the frame rate of the display section 2 is set to a lower value for darker surroundings. This enables extension of the display off period and accordingly the exposure time, allowing the imaging sensitivity of the imaging section 4 to be improved.

Figure 19:
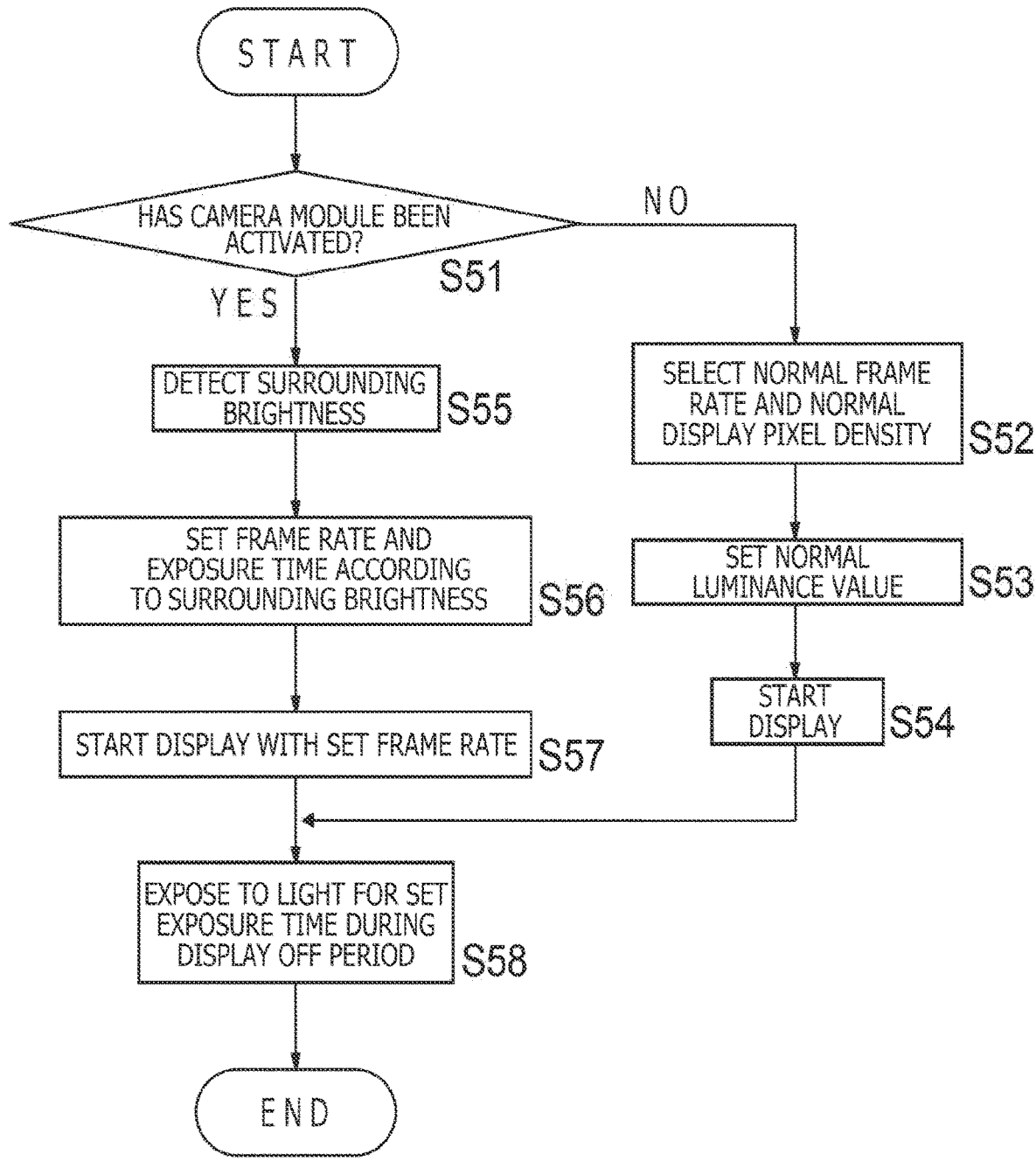
FIG. 19 is a flowchart depicting a processing operation of the electronic equipment according to the sixth embodiment.

FIG. 19 is a flowchart depicting processing operations of the electronic equipment 1 according to the sixth embodiment. Differences from the flowchart in FIG. 9 will mainly be described below. In steps S51 to S54 in FIG. 19, processing similar to that in steps S21 to S24 in FIG. 9 is executed. In a case where the camera module 3 is activated, the brightness detection section 26 detects the surrounding brightness (step S55). Next, the frame rate and the exposure time are set according to the surrounding brightness detected (step S56). Then, display is initiated at the set frame rate (step S57). Subsequently, the imaging section 4 performs imaging during the set exposure time within the display off period (step S58).

Figure 20:
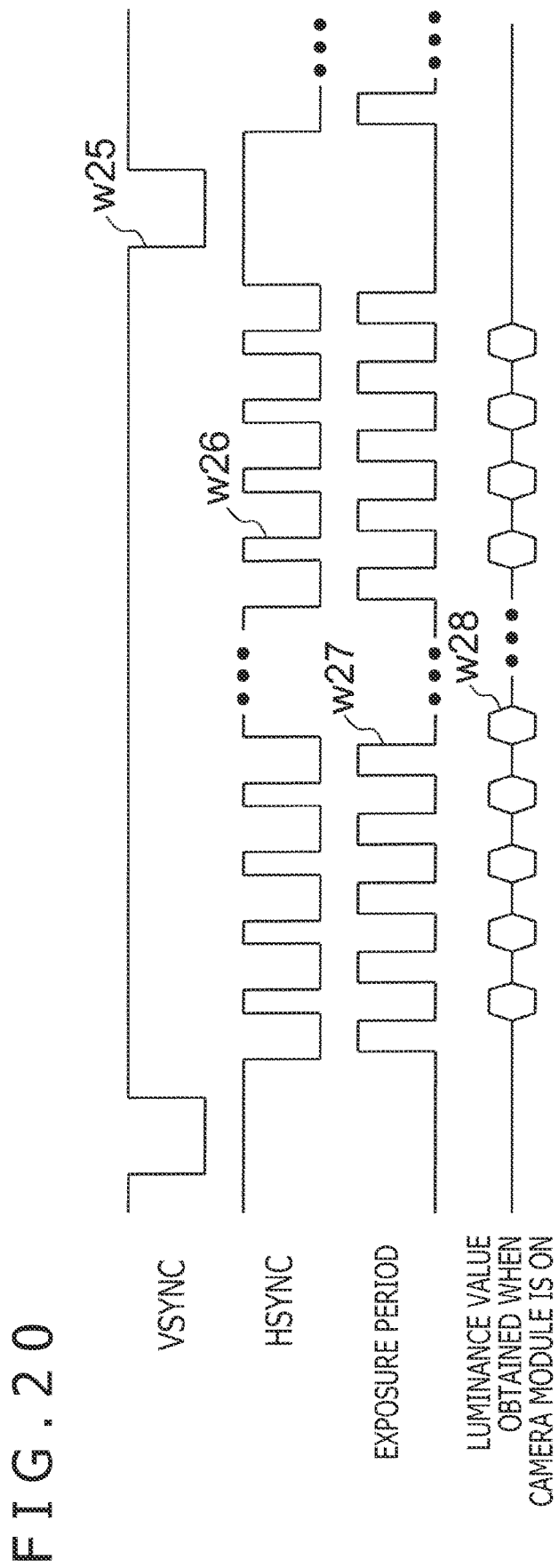
FIG. 20 is an operation timing diagram corresponding to the flowchart in FIG. 19.

FIG. 20 is an operation timing diagram corresponding to the flowchart in FIG. 19. A waveform w25 represents the vertical synchronization signal VSYNC, a waveform w26 represents the horizontal synchronization signal HSYNC, a waveform w27 represents the exposure time, and a waveform w28 is the luminance value of the pixel data.

A comparison between FIG. 20 and FIG. 10 indicates that the display luminance is not adjusted in the present embodiment. This is because improvement of imaging sensitivity of the imaging section 4 is given preference over the visibility of the display section 2.

The flowchart in FIG. 19 assumes that the frame rate of the entire display region of the display section 2 is varied according to the surrounding brightness as in FIG. 11. However, for the second display region 2r2 including some horizontal pixel lines as depicted in FIGS. 14A to 14C or the second display region 2r2 including some pixel blocks as depicted in FIGS. 17A and 17B, the display pixel density corresponding to the surrounding brightness may be used for the display.

As described above, in the sixth embodiment, the frame rate or the display pixel density is controlled according to the surrounding brightness. Hence, for example, for darker surroundings, the frame rate or the display pixel density is set to a lower value to enable extension of the display off period, allowing the imaging sensitivity of the imaging section 4 to be improved.

Seventh Embodiment

A seventh embodiment is configured to detect a blink of the person viewing the display section 2 of the electronic equipment 1 and to turn off the display on the display section 2 during the period in which the person's eyes are closed, with the imaging section 4 performing imaging during this period.

Figure 21:
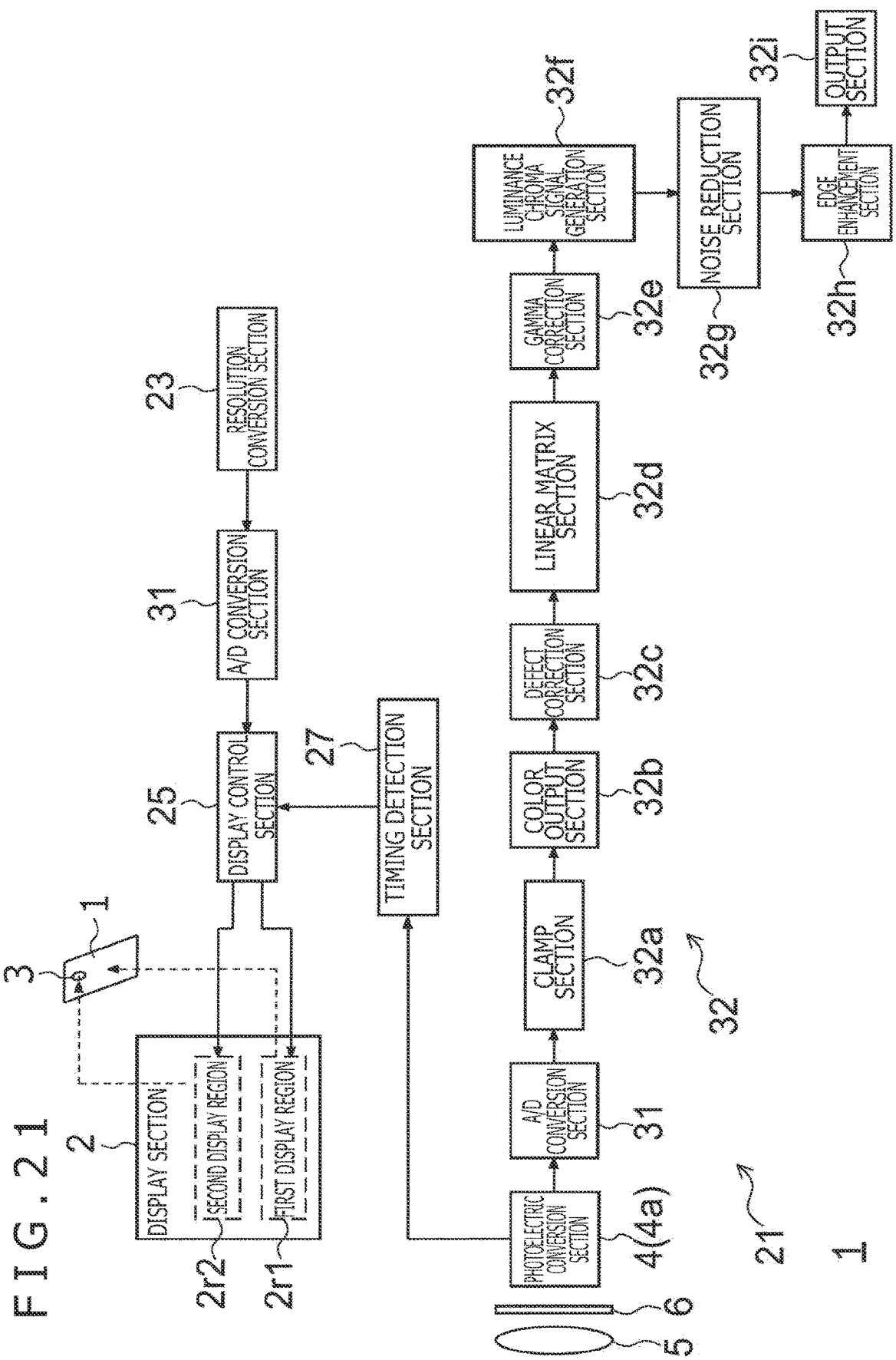
FIG. 21 is a block diagram depicting an internal configuration of electronic equipment according to a seventh embodiment.

FIG. 21 is a block diagram depicting an internal configuration of the electronic equipment 1 according to the seventh embodiment. The electronic equipment 1 in FIG. 21 includes the imaging apparatus 21, a timing detection section 27, the resolution conversion section 23, the A/D conversion section 31, the display control section 25, and the display section 2. FIG. 21 lacks the application processor 22, the imaging control section 33, and the exposure adjustment section 34, which are present in FIG. 4. However, the application processor 22, the imaging control section 33, and the exposure adjustment section 34 may be provided.

The timing detection section 27 detects the timing of a blink of a person in a captured image in reference to digital pixel data output from the A/D conversion section 31. Then, the timing detection section 27 notifies the display control section 25 of information indicating the timing when the person closes his/her eyes and the timing when the person opens his/her eyes. The display control section 25 performs control such that the display on the display section 2 is turned off during the period in which the person's eyes are closed and that the display on the display section 2 is turned on during the period in which the person's eyes are open.

Figure 22:
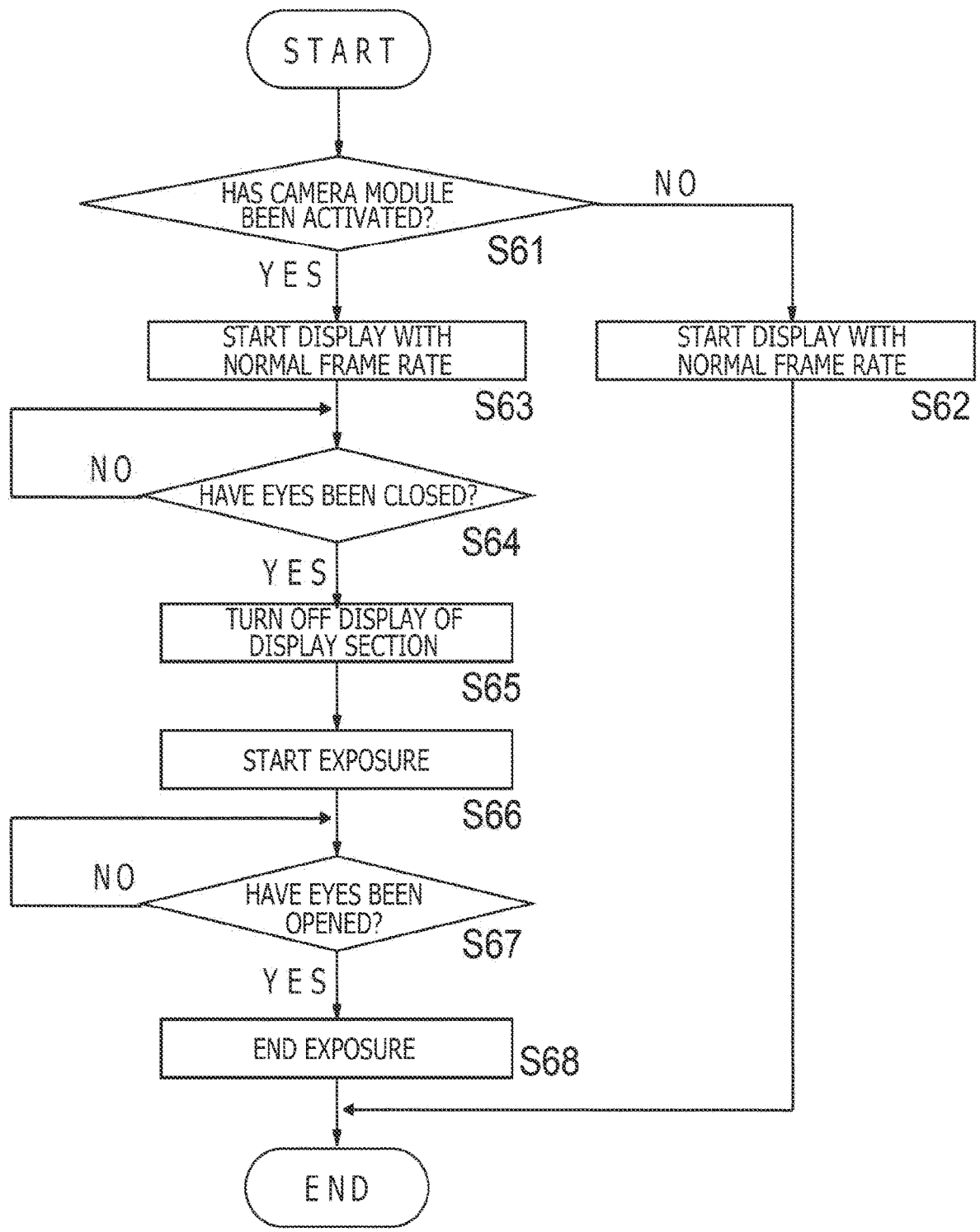
FIG. 22 is a flowchart depicting a processing operation of the electronic equipment according to the seventh embodiment.

FIG. 22 is a flowchart depicting processing operations of the electronic equipment 1 according to the seventh embodiment. In a case where the camera module 3 is not activated (NO in step S61), display is initiated at the normal frame rate (step S62). On the other hand, in a case where the camera module 3 is activated (YES in step S61), display is initiated at the normal frame rate (step S63). Then, in reference to information from the timing detection section 27, whether or not a person's eyes are closed is determined (step S64). The processing in steps S63 and S64 is repeated until the person's eyes are closed.

When the person's eyes are determined to be closed, the display on the display section 2 is turned off (step S65), and the imaging section 4 initiates exposure (step S66). Subsequently, in reference to information from the timing detection section 27, whether or not the person's eyes are open is determined (step S67). When the person's eyes are determined to be open, the imaging section 4 terminates the exposure (step S68).

Thus, in the seventh embodiment, a person's blink is detected, and when the person's eyes are closed, the display on the display section 2 is turned off. The exposure time is set according to the period of time in which the person's eyes are closed, and the imaging section 4 performs imaging. Hence, the imaging section 4 performs imaging with the display on the display section 2 turned off, allowing the image quality of captured images to be improved. Further, the display on the display section 2 is turned off during the period of time in which the person's eyes are closed by the person's blink, preventing turn-off of the display from being recognized. This in turn prevents the person from feeling uncomfortable.

Eighth Embodiment

The fourth and fifth embodiments described above illustrate examples in which the first display region 2r1 and the second display region 2r2 are provided in the display surface 1a of the display section 2. However, the display surface 1a of the first display region 2r1 (hereinafter referred to as a first display surface) and the display surface 1a of the second display region 2r2 (hereinafter referred to as a second display surface) may be provided in different layers. The layer of the first display surface and the layer of the second display surface are stacked in the front to back direction, and the display regions are disposed in a manner not overlapping when the layer of the first display surface and the layer of the second display surface are stacked. Thus, in a case where the gaze is turned toward the display section 2, the first display region 2r1 and the second display region 2r2 are viewed as being merged together, preventing the observer from feeling uncomfortable.

By providing the first display region 2r1 and the second display region 2r2 on different display surfaces 1a as described above, the display control of the first display region 2r1 and the display control of the second display region 2r2 can be performed separately, facilitating processing operations of the display control section 25.

Ninth Embodiment

The electronic equipment 1 according to a ninth embodiment differs from those according to the first to the eighth embodiments in the optical system 5 of the camera module 3.

Figure 23:
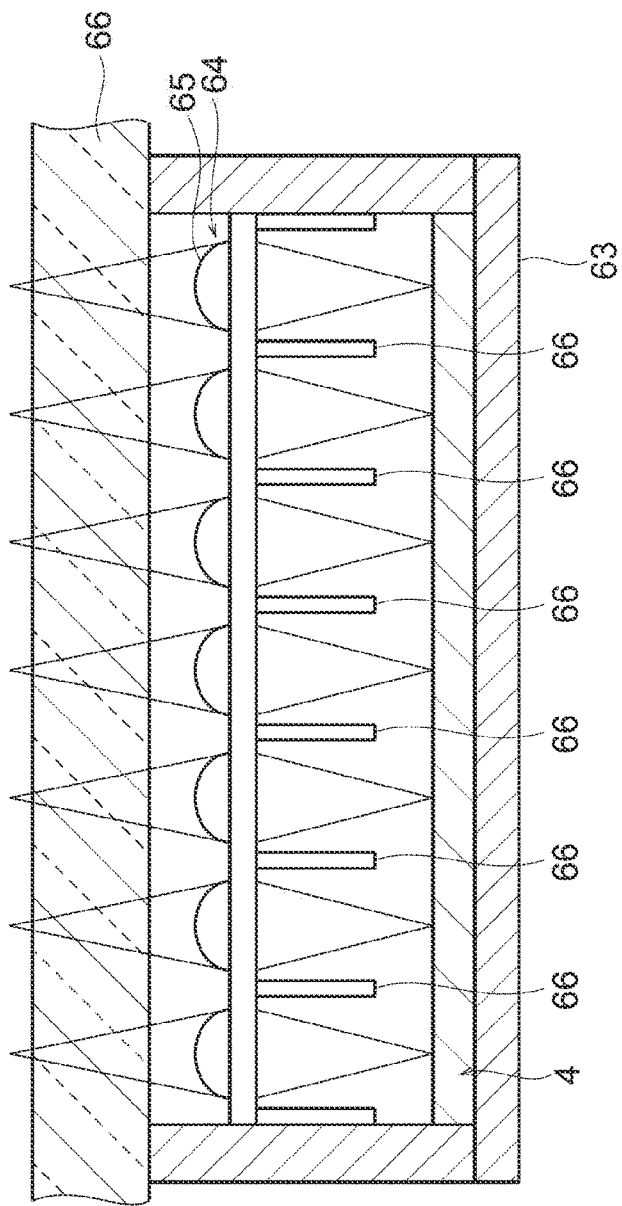
FIG. 23 is a diagram depicting a cross section structure of an imaging section of a camera module according to a ninth embodiment.

FIG. 23 is a diagram depicting a cross section structure of the imaging section 4 of the camera module 3 mounted in the electronic equipment 1 according to the ninth embodiment. The imaging section 4 in FIG. 23 includes a micro lens array 64 in place of a single lens or a lens group including single lenses aligned in an optical axis direction.

More specifically, the imaging section 4 in FIG. 23 includes the photoelectric conversion section 4a disposed along a bottom surface of a housing 63, the micro lens array 64 disposed above the photoelectric conversion section 4a, multiple light blocking bodies 66 disposed between micro lenses 65 adjacent to each other, and a light guide plate 67 disposed above the micro lens array 64. The imaging section 4 in FIG. 23 is applicable to any of the first to the eighth embodiments described above.

By providing the micro lens array 64 as the optical system 5 of the imaging section 4 as described above, the effects of adjacent pixels can be prevented, enabling a reduction in color bleeding.

Tenth Embodiment

A portion of light passing through the display section 2 is incident on the camera after being reflected and diffracted, and thus the image quality of captured images may be degraded under the effect of diffraction or flare attributable to reflection. As such, a polarizing element 8b is provided in the imaging section 4 according to the first to the ninth embodiments described above, to acquire polarization information including components of flare light and diffracted light, and the polarization information may be used to generate digital pixel data free from the components of the flare light and the diffracted light.

Figure 24:
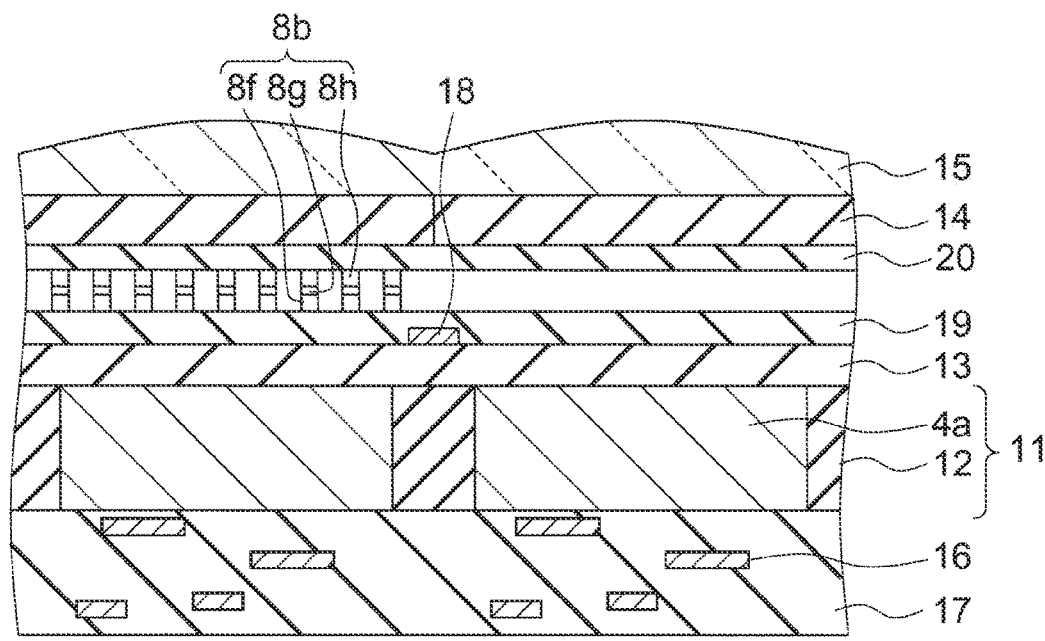
FIG. 24 is a diagram depicting a cross section structure of an imaging section according to a tenth embodiment.

A cross section structure of the imaging section 4 in this case is expressed by, for example, such a cross-sectional view as that illustrated in FIG. 24. In FIG. 24, sections common to FIG. 3 are denoted by the same reference signs, and differences from FIG. 3 will mainly be described below. In the imaging section 4 in FIG. 13, a light blocking layer 18 and a foundation insulating layer 19 are disposed on the planarization layer 13, and multiple polarizing elements 8b are disposed on the foundation insulating layer 19 and spaced apart from one another. The polarizing elements 8b are, for example, wire grid polarizing elements 8b of a line and space structure disposed in a part of the foundation insulating layer 19.

Figure 25:
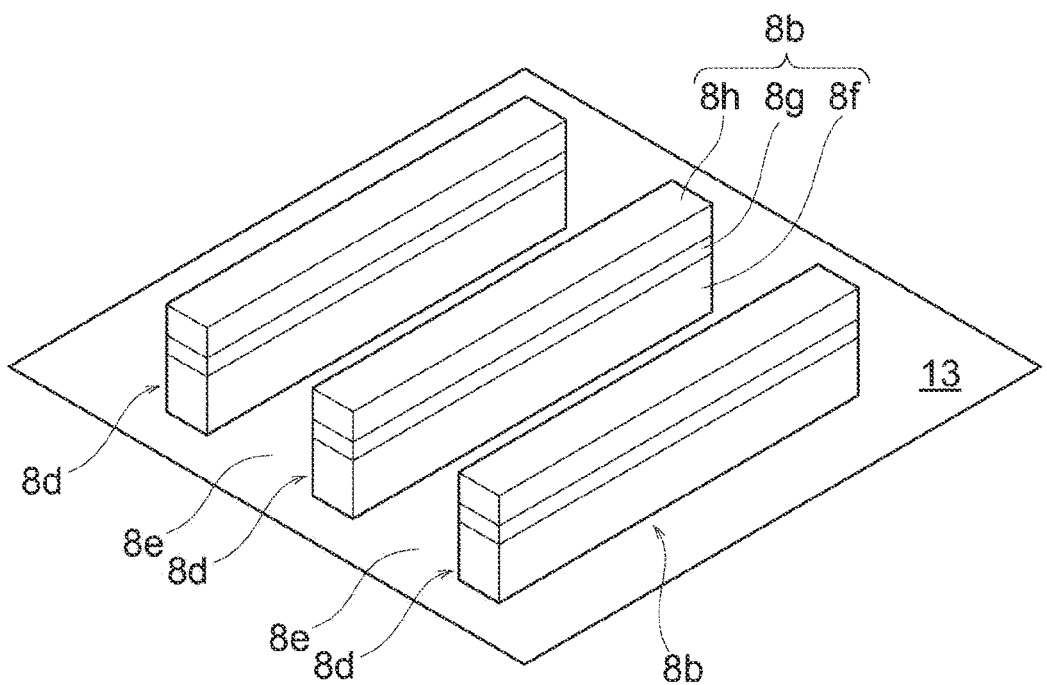
FIG. 25 is a perspective view depicting an example of a detailed structure of each polarizing element 8b.

FIG. 25 is a perspective view depicting an example of a detailed structure of each polarizing element 8b. Each of the multiple polarizing elements 8b includes multiple line portions 8d each having a protruding shape and extending in one direction and space portions 8e each between the line portions 8d, as depicted in FIG. 25. Multiple types of polarizing elements 8b that vary in the direction in which the line portions 8d extend are available. More specifically, three or more types of the polarizing elements 8b are available, and for example, three types of angles of 0 degrees, 60 degrees, and 120 degrees may be formed between an arrangement direction of the photoelectric conversion sections 4a and an extending direction of the line portions 8d. Alternatively, four types of angles of 0 degrees, 45 degrees, 90 degrees, and 135 degrees or any other angle may be formed between the arrangement direction of the photoelectric conversion sections 4a and the extending direction of the line portions 8d. Alternatively, multiple polarizing elements 8b may polarize light in a single direction. A material for the multiple polarizing elements 8b may be a metal material such as aluminum or tungsten, or an organic photoelectric conversion film.

The multiple polarizing elements 8b are disposed on a light incident side of at least one of the multiple photoelectric conversion sections 4a. Each of the polarizing elements 8b polarizes light incident through the display section 2. The light polarized by the polarizing element 8b is incident on the corresponding photoelectric conversion section 4a and is photoelectrically converted. In the following description, polarization information refers to an output value from the photoelectric conversion section 4a that photoelectrically converts light polarized by the polarizing element 8b, and a pixel value or pixel information refers to an output value from the photoelectric conversion section 4a that photoelectrically converts light incident without passing through the polarizing element 8b. Further, in the following description, a polarization pixel refers to a combination of the polarizing element 8b and the photoelectric conversion section 4a that photoelectrically converts light polarized by the polarizing element 8b, and a non-polarization pixel refers to the photoelectric conversion section 4a that photoelectrically converts light incident without passing through the polarizing element 8b.

Referring back to FIG. 24, a planarization layer 20 is disposed on the insulating layer 19, in which the multiple polarizing elements 8b are disposed. The color filter layer 14 is disposed on the planarization layer 20.

Figure 26:
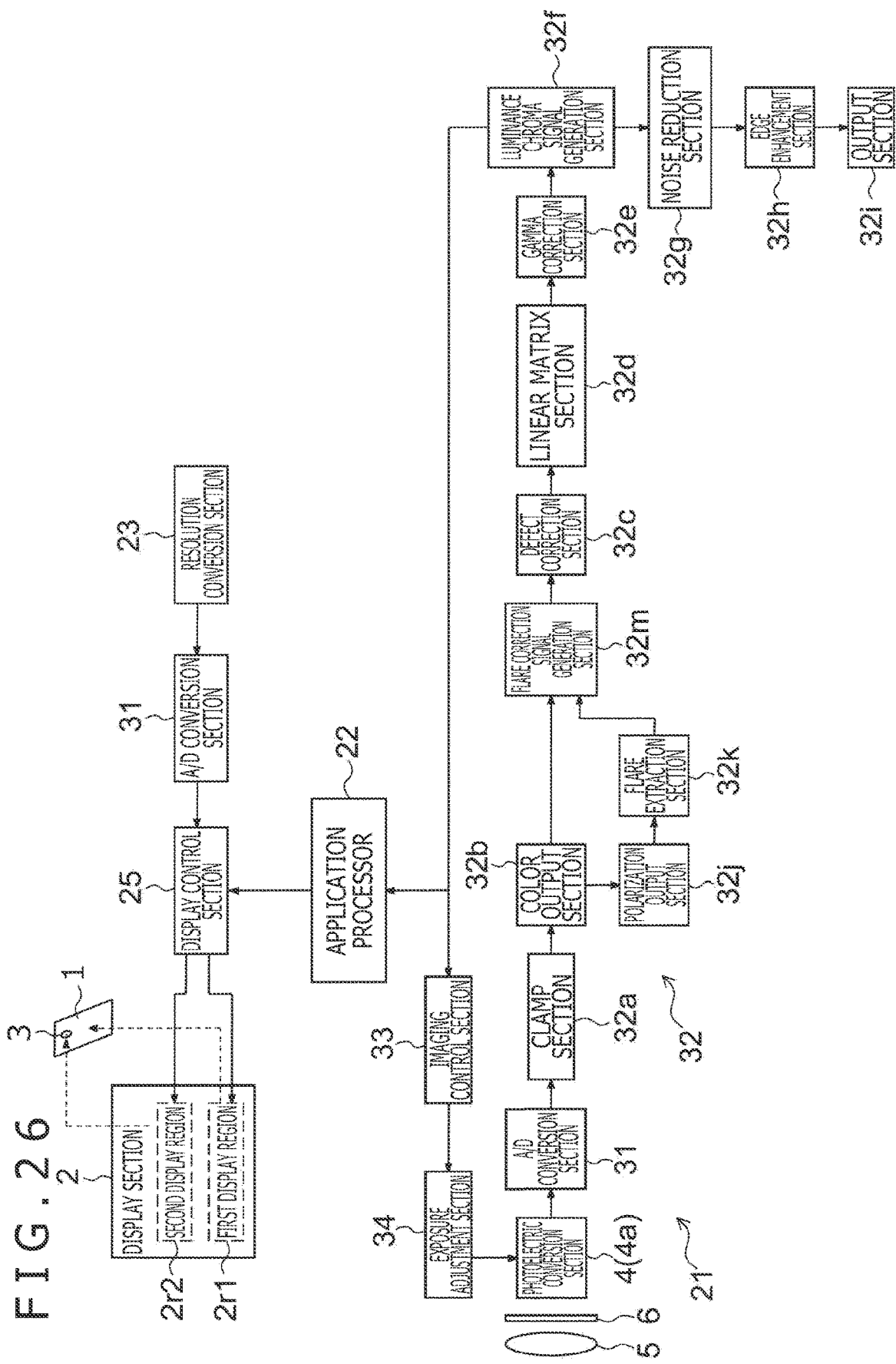
FIG. 26 is a block diagram depicting an internal configuration of electronic equipment including a function to suppress the effect of flare light or diffraction light.

FIG. 26 is a block diagram depicting an internal configuration of electronic equipment including a function to suppress the effects of flare light or diffracted light. In FIG. 26, sections common to FIG. 4 are denoted by the same reference signs, and differences from FIG. 4 will mainly be described below. The electronic equipment in FIG. 26 includes, in addition to the internal configuration in FIG. 4, a polarized light output section 32j, a flare extraction section 32k, and a flare correction signal generation section 32m.

The polarized light output section 32j outputs polarization information data. The flare extraction section 32k extracts at least one of a flare component and a diffracted light component from the polarization information data. At least one of the flare component and the diffracted light component extracted by the flare extraction section 32k is a correction amount. The flare correction signal generation section 32m executes subtraction processing for subtracting the correction amount extracted by the flare extraction section 32k from digital pixel data output from the color output section 32b, to correct the digital pixel data. Output data from the flare correction signal generation section 32m is digital pixel data free from at least one of the flare component and the diffracted light component. As described above, the flare correction signal generation section 32m functions as a correction section correcting a captured image photoelectrically converted by multiple non-polarizing elements in reference to the polarization information.

The digital pixel data at the pixel position of a polarization pixel has a signal level lowered due to passage through the polarizing element 8b. Hence, the defect correction section 32c considers the polarization pixel as a defect and executes predetermined defect correction processing.

By using the multiple polarizing elements 8b to acquire polarization information as depicted in FIGS. 24 to 26, a captured image from which the flare component and the diffracted light component that are contained in light that is repeatedly reflected within the display section 2 and then enters the multiple non-polarization pixels are easily and reliably removed can be generated.

Eleventh Embodiment

Figure 27:
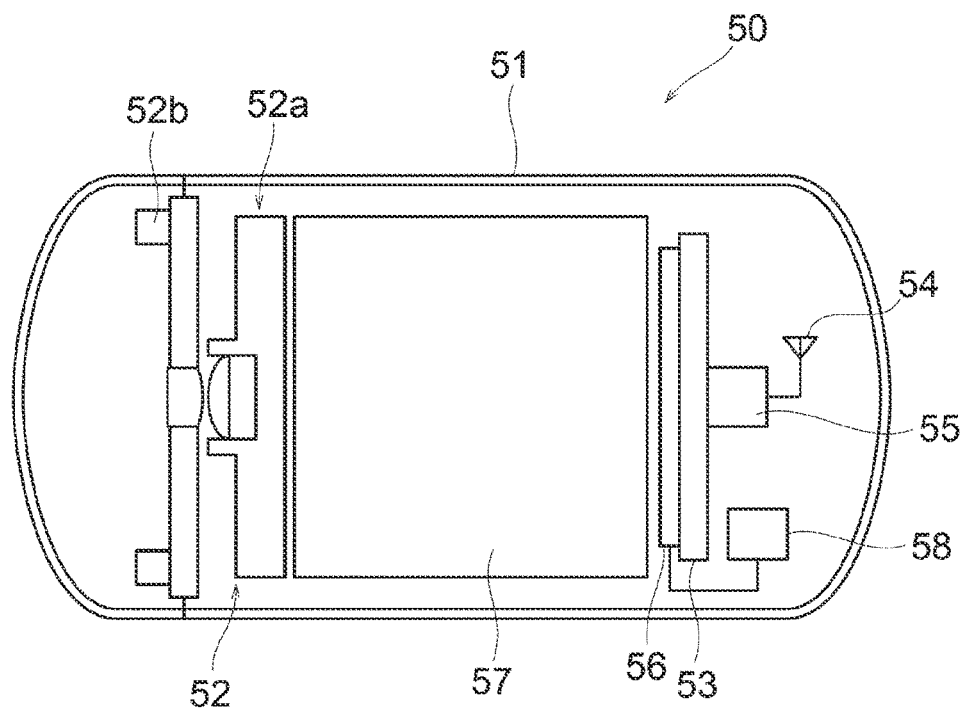
FIG. 27 is a plan view of a capsule endoscope to which the electronic equipment according to the first to fourth embodiments is applied.

Various specific candidates are possible for the electronic equipment 1 including the configuration described in the first to the fourth embodiments described above. For example, FIG. 27 is a plan view of a case where the electronic equipment 1 according to the first to the fourth embodiments is applied to a capsule endoscope 50. The capsule endoscope 50 in FIG. 27 includes, for example, a housing 51 having a hemispherical shape at both end surfaces and a cylindrical shape at a central portion, a camera (ultracompact camera) 52 for capturing images of the inside of the body cavity, a memory 53 in which image data of images captured by the camera 52 is recorded, and a radio transmitter 55 for transmitting recorded image data to the outside via an antenna 54 after the capsule endoscope 50 is discharged to the outside of the body of a subject.

Further, a CPU (Central Processing Unit) 56 and a coil (magnetic force-current conversion coil) 57 are provided in the housing 51. The CPU 56 controls image capturing by the camera 52 and an operation of accumulating data in the memory 53, and also controls data transmission from the memory 53 to a data receiver (not depicted) outside the housing 51 by the radio transmitter 55. The coil 57 supplies power to the camera 52, the memory 53, the radio transmitter 55, the antenna 54, and a light source 52b described below.

Moreover, the housing 51 is provided with a magnetic (reed) switch 58 for detecting the capsule endoscope 50 being set in the data receiver. Once the reed switch 58 detects the setting in the data receiver and data transmission is enabled, the CPU 56 supplies power from the coil 57 to the radio transmitter 55.

The camera 52 includes, for example, an imaging element 52a including an objective optical system for capturing images of the inside of the body cavity, and multiple light sources 52b lighting the inside of the body cavity. Specifically, the camera 52 includes, for example, a CMOS (Complementary Metal Oxide Semiconductor) sensor, a CCD (Charge Coupled Device), or the like including LEDs (Light Emitting Diodes) as the light sources 52b.

The display section 2 in the electronic equipment 1 according to the first to the fourth embodiments is a concept including light emitting bodies such as the light sources 52b in FIG. 27. The capsule endoscope 50 in FIG. 27 includes, for example, two light sources 52b, and the light sources 52b can be configured by a display panel including multiple light source sections or a LED module including multiple LEDs. In this case, disposing the imaging section 4 of the camera 52 below the display panel or the LED module reduces constraints on the layout of the camera 52, allowing a smaller capsule endoscope 50 to be implemented.

Figure 28:
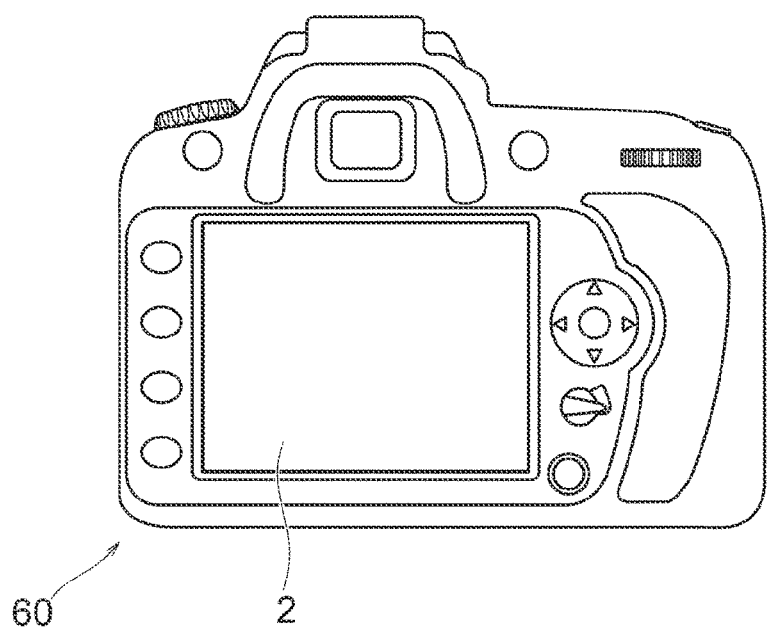
FIG. 28 is a rear view of a digital single-lens reflex camera to which the electronic equipment according to the first to fourth embodiments is applied.

Further, FIG. 28 is a rear view of a digital single-lens reflex camera 60 to which the electronic equipment 1 according to the first to the fourth embodiments is applied. The digital single-lens reflex camera 60 and a compact camera include the display section 2 that is provided on a rear surface opposite co the lens and that displays a preview screen. The camera module 3 may be disposed opposite to the display surface of the display section 2 to allow a face image of a photographer to be displayed on the display surface 1a of the display section 2. In the electronic equipment 1 according to the first to the fourth embodiments, the camera module 3 can be disposed in a region overlapping the display section 2 and need not be provided in a bezel portion of the display section 2. This enables the size of the display section 2 to be maximized.

Figure 29A:
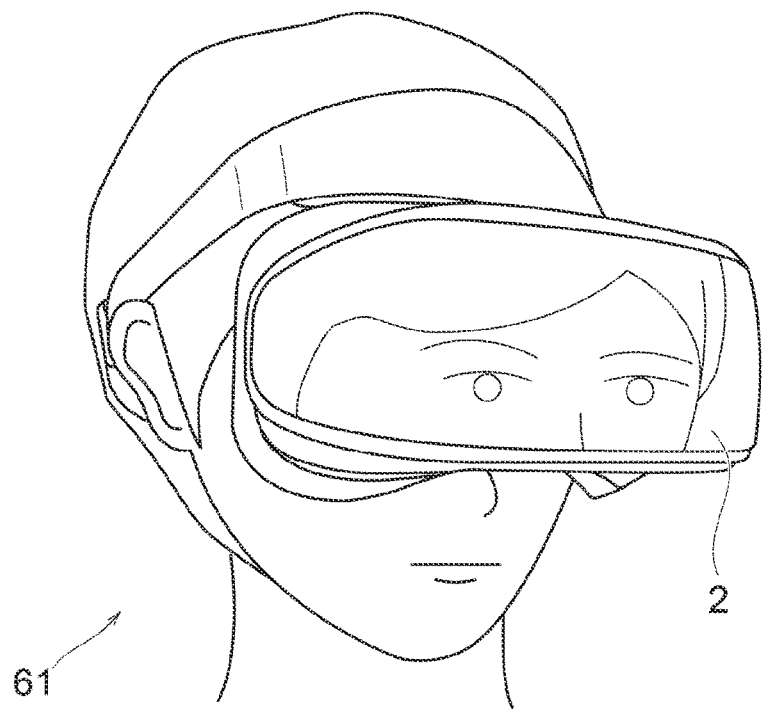
FIG. 29A is a plan view depicting an example in which the electronic equipment according to the first to fourth embodiments is applied to an HMD.
Figure 29B:
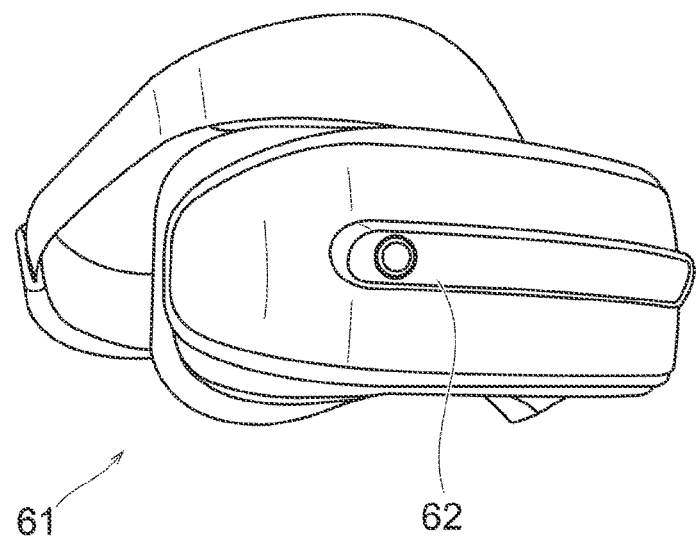
FIG. 29B is a diagram depicting a current HMD.

FIG. 29A is a plan view depicting an example in which the electronic equipment 1 according to the first to the fourth embodiments is applied to a head-mounted display (hereinafter referred to as the HMD). An HMD 61 in FIG. 29A is used for VR (Virtual Reality), AR (Augmented Reality), MR (Mixed Reality), SR (Substitutional Reality), or the like. The current HMD includes a camera 62 on an outer surface as depicted in FIG. 29B, and thus poses a problem in that whereas a wearer of the HMD can view surrounding images, persons around the wearer are prevented from recognizing the expressions of eyes and face of the wearer of the HMD.

As such, in FIG. 29A, the display surface of the display section 2 is provided on an outer surface of the HMD 61, and the camera module 3 is provided opposite to the display surface of the display section 2. Thus, the camera module 3 can be used to capture images of the expressions of face of the wearer, and the captured images can be displayed on the display surface of the display section 2. This allows the persons around the wearer to recognize the expressions of the face of the wearer and the movement of the eyes of the wearer in real time.

In the case of FIG. 29A, the camera module 3 is provided on the rear surface side of the display section 2, removing constraints on the installation location of the camera module 3 and enabling an increase in the degree of freedom for the design of the HMD 61. Further, the camera can be disposed at the optimal position, allowing prevention of the problem that the gaze of the wearer displayed on the display surface is not correctly directed, for example.

Thus, in the eleventh embodiment, the electronic equipment 1 according to the first to the fourth embodiments can be used for various applications, and thus the eleventh embodiment can improve the usefulness of the electronic equipment 1.

Note that the present technology can take the configurations described below.

(1) Electronic equipment including:
a display section;
an imaging section disposed opposite to a display surface of the display section; and
a control section that synchronizes a display timing of the display section with an imaging timing of the imaging section such that the imaging section performs imaging at a timing when the display section does not perform displaying.

(2) The electronic equipment according to (1), in which
the control section sets a longer period of time in which the display section does not perform displaying, when the imaging section performs imaging than in a case where the imaging section does not perform imaging.

(3) The electronic equipment according to (1) or (2), in which
the control section sets a lower frequency at which at least some of pixels in the display section are displayed, when the imaging section performs imaging than in the case where the imaging section does not perform imaging.

(4) The electronic equipment according to (3), in which
the control section sets a lower frame rate for the display section when the imaging section performs imaging than in the case where the imaging section does not perform imaging.

(5) The electronic equipment according to (3), in which
the control section sets a lower display frequency for at least some of horizontal pixel lines in the display section when the imaging section performs imaging than in the case where the imaging section does not perform imaging.

(6) The electronic equipment according to (5), in which
the control section sets a lower display frequency for the some of horizontal pixel lines including a display region overlapping the imaging section as the display section is viewed in plan from a normal direction of the display surface, when the imaging section performs imaging than in the case where the imaging section does not perform imaging.

(7) The electronic equipment according to any one of (1) to (6), in which
the control section sets an exposure time for the imaging section according to a period of time in which the display section does not perform imaging.

(8) The electronic equipment according to any one of (1) to (7), in which
the control section sets a lower display pixel density for inside of at least a partial display region of the display section when the imaging section performs imaging than in the case where the imaging section does not perform imaging.

(9) The electronic equipment according to (8), in which
the control section sets a lower display pixel density for inside of a partial display region including a display region overlapping the imaging section as the display section is viewed in plan from the normal direction of the display surface, when the imaging section performs imaging than in the case where the imaging section does not perform imaging.

(10) The electronic equipment according to (8) or (9), in which
the control section sets a higher luminance value for pixels in at least a partial display region of the display section when the imaging section performs imaging than in the case where the imaging section does not perform imaging.

(11) The electronic equipment according to (10), in which
the control section sets a higher luminance value for pixels in the partial display region including a display region overlapping the imaging section as the display section is viewed in plan from the normal direction of the display surface, when the imaging section performs imaging than in the case where the imaging section does not perform imaging.

(12) The electronic equipment according to (11), in which
the control section sets a lower frequency at which pixels in the partial display region are displayed and a higher luminance value for the pixels when the imaging section performs imaging than in the case where the imaging section does not perform imaging.

(13) The electronic equipment according to any one of (8) to (12), in which
the display section includes a first display surface and a second display surface that are stacked one on another but are separately controlled for display,
the first display surface displays a display region of the display section except for the partial display region, and
the second display surface displays the partial display region such that the partial display region does not overlap the display region of the first display surface when the second display surface is stacked on the first display surface.

(14) The electronic equipment according to any one of (1) to (13), including:
a brightness detection section that detects surrounding brightness, in which
the control section controls, according to the surrounding brightness detected by the brightness detection section, a frequency at which at least some of pixels in the display section are displayed when the imaging section performs imaging.

(15) The electronic equipment according to (14), in which
the control section controls, according to the surrounding brightness detected by the brightness detection section, a frequency and a display pixel density at which at least some of the pixels in the display section are displayed when the imaging section performs imaging.

(16) The electronic equipment according to any one of (1) to (15), including:
a timing detection section that detects a timing of a blink of a person with a gaze directed to the display section, in which,
according to the timing detected by the timing detection section, the control section temporarily sets display on the display section to a non-light-emission state and causes the imaging section to perform imaging.

(17) The electronic equipment according to any one of (1) to (16), in which
the imaging section photoelectrically converts at least one of visible light and infrared light.

(18) The electronic equipment according to any one of (1) to (17), in which
the display section includes an opening at a position overlapping the imaging section when the display section is viewed in plan from the normal direction of the display surface, and
the opening is disposed to penetrate at least one of multiple layers constituting the display section, the at least one layer having transmittance of less than a predetermined value with respect to light with a predetermined wavelength band.

(19) The electronic equipment according to any one of (1) to (18), in which
the display section includes multiple layers having transmittance of a predetermined value or larger with respect to light with a wavelength band that is photoelectrically convertible by the imaging section.

(20) The electronic equipment according to any one of (1) to (19), in which
the control section includes
a first control section that controls the display section for display, and
a second control section that cooperates with the first control section in controlling the imaging section for imaging.

The aspects of the present disclosure are not limited to the individual embodiments described above and include many variations that may be conceived of by a person skilled in the art. The effects of the present disclosure are also not limited to the contents described above. In other words, various additions, modifications, and partial removals can be made without departing from conceptual ideas and spirits of the present disclosure derived from the contents defined in claims and equivalents thereof.

REFERENCE SIGNS LIST

1: Electronic equipment
2: Display section
3: Camera module
4: Imaging section
4a: Photoelectric conversion section
5: Optical system
11: Semiconductor substrate
12: Element isolation layer
13: Planarization layer
14: Color filter layer
15: On-chip lens
16: Read circuit
17: Interlayer insulating film
21: Imaging apparatus
22: Application processor
23: Resolution conversion section
24: A/D conversion section 25: Display control section
31: A/D conversion section
32: Signal processing section
33: Imaging control section
34: Exposure adjustment section

The invention claimed is:

1. An electronic equipment comprising:
   a display;
   an imager disposed opposite to a display surface of the display; and
   control circuitry configured to synchronize a display timing of the display with an imaging timing of the imager such that the imager performs imaging at a timing when the display does not perform displaying, wherein
   the control circuitry sets a lower frequency for displaying at least some pixels in the display when the imager performs imaging than in a case where the imager does not perform imaging, and
   the control circuitry sets a lower frame rate for the display when the imager performs imaging than in a case where the imager does not perform imaging.

2. The electronic equipment according to claim 1, wherein the control circuitry sets a longer period of time in which the display does not perform displaying when the imager performs imaging than in a case where the imager does not perform imaging.

3. The electronic equipment according to claim 1, wherein the control circuitry sets the lower frequency for at least some horizontal pixel lines in the when the imager performs imaging.

4. The electronic equipment according to claim 1, wherein the control circuitry sets an exposure time for the according to a period of time in which the display does not perform displaying.

5. The electronic equipment according to claim 1, wherein the control circuitry sets a lower display pixel density for a display region of the display when the imager performs imaging than in a case where the imager does not perform imaging.

6. The electronic equipment according to claim 1, further comprising:
   a brightness detector that detects a surrounding brightness, wherein
   the control circuitry controls, according to the surrounding brightness detected by the brightness detector, a frequency at which at least some pixels in the display are displayed when the imager performs imaging.

7. The electronic equipment according to claim 1, further comprising:
   a timing detector that detects a timing of a blink of a person with a gaze directed to the display, wherein,
   according to the timing detected by the timing detector, the control circuitry temporarily sets the display to a non-light-emission state and causes the imager to perform imaging.

8. The electronic equipment according to claim 1, wherein the imager photoelectrically converts at least one of visible light and infrared light.

9. The electronic equipment according to claim 1, wherein the display includes an opening at a position overlapping the imager when the display is viewed in plan from a normal direction of the display surface, and
   the opening is disposed to penetrate at least one of multiple layers constituting the display, the at least one layer having transmittance of less than a predetermined value with respect to light with a predetermined wavelength band.

10. The electronic equipment according to claim 1, wherein
    the display includes multiple layers having transmittance of a predetermined value or larger with respect to light with a wavelength band that is photoelectrically convertible by the imager.

11. The electronic equipment according to claim 1, wherein
    the control circuitry performs a first control that controls the display for display, and a second control that cooperates with the first control in controlling the imager for imaging.

12. An electronic equipment comprising:
    a display;
    an imager disposed opposite to a display surface of the display; and
    control circuitry configured to synchronize a display timing of the display with an imaging timing of the imager such that the imager performs imaging at a timing when the display does not perform displaying, wherein
    the control circuitry sets a lower frequency for displaying at least some horizontal pixel lines in the display when the imager performs imaging than in a case where the imager does not perform imaging, the at least some horizontal pixel lines including a display region overlapping the imager as the display is viewed in plan from a normal direction of the display surface.

13. An electronic equipment comprising:
    a display;
    an imager disposed opposite tot a display surface of the display; and
    control circuitry configured to synchronize a display timing of the display with an imaging timing of the imager such that the imager performs imaging at a timing when the display does not perform displaying, wherein
    the control circuitry sets a lower display pixel density for a display region of the display when the imager performs imaging than in a case where the imager does not perform imaging, the display region overlapping the imager as the display is viewed in plan from a normal direction of the display surface.

14. An electronic equipment comprising:
    a display;
    an imager disposed opposite to a display surface of the display; and
    control circuitry configured to synchronize a display timing of the display with an imaging timing of the imager such that the imager performs imaging at a timing when the display does not perform displaying, wherein
    the control circuitry sets a lower display pixel density for a display region of the display when the imager performs imaging than in a case where the imager does not perform imaging, and
    the control circuitry sets a higher luminance value for pixels in the display region when the imager performs imaging than in the case where the imager does not perform imaging.

15. The electronic equipment according to claim 14, wherein
the display region overlaps the imager as the display is viewed in plan from a normal direction of the display surface.

16. The electronic equipment according to claim 15, wherein
the control circuitry sets a lower frequency at which the pixels in the display region are displayed and a higher luminance value for the pixels display in the display region when the imager performs imaging than in the case where the imager does not perform imaging.

17. An electronic equipment comprising:
a display;
an imager disposed opposite to a display surface of the display; and
control circuitry configured to synchronize a display timing of the display with an imaging timing of the imager such that the imager performs imaging at a timing when the display does not perform displaying, wherein
the control circuitry sets a lower display pixel density for a partial display region of the display when the imager performs imaging than in a case where the imager does not perform imaging,
the display includes a first display surface and a second display surface that is stacked on the first display surface,
the first and second display surfaces are separately controllable for display,
the first display surface displays an other display region of the display other than the partial display region, and
the second display surface displays the partial display region such that the partial display region does not overlap the other display region of the first display surface.

18. An electronic equipment comprising:
a display;
an imager disposed opposite to a display surface of the display; and
control circuitry configured to synchronize a display timing of the display with an imaging timing of the imager such that the imager performs imaging at a timing when the display does not perform displaying; and
a brightness detector that detects a surrounding brightness, wherein
the control circuitry controls, according to the surrounding brightness, a frequency at which at least some pixels in the display are displayed when the imager performs imaging, and
the control circuitry controls, according to the surrounding brightness, a display pixel density at which at least some pixels in the display are displayed when the imager performs imaging.

* * * * *